(12) United States Patent
Bhandarkar et al.

(10) Patent No.: US 12,040,632 B2
(45) Date of Patent: Jul. 16, 2024

(54) TRANSMIT COIL SELECTION RESPONSIVE TO AVERAGE PEAK TO PEAK MEASUREMENT VOLTAGE POTENTIALS AND RELATED APPARATUSES AND METHOD

(71) Applicant: Microchip Technology Incorporated, Chandler, AZ (US)

(72) Inventors: Santosh Bhandarkar, Chandler, AZ (US); Alex Dumais, Boise, ID (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/664,769

(22) Filed: May 24, 2022

(65) Prior Publication Data

US 2022/0376559 A1 Nov. 24, 2022

Related U.S. Application Data

(60) Provisional application No. 63/202,035, filed on May 24, 2021.

(51) Int. Cl.
*H02J 50/60* (2016.01)
*H02J 50/05* (2016.01)
*H02J 50/12* (2016.01)
*H02J 50/40* (2016.01)

(52) U.S. Cl.
CPC .............. *H02J 50/60* (2016.02); *H02J 50/05* (2016.02); *H02J 50/12* (2016.02); *H02J 50/40* (2016.02)

(58) Field of Classification Search
CPC .. H02J 50/00; H02J 50/12; H02J 50/40; H02J 50/60
See application file for complete search history.

(56) References Cited

U.S. PATENT DOCUMENTS

| 10,630,090 | B2 | 4/2020 | Fischer et al. | |
| 2012/0242160 | A1* | 9/2012 | Tseng | H04B 5/26 307/104 |
| 2018/0131235 | A1* | 5/2018 | Inoue | H02J 50/12 |
| 2020/0336018 | A1* | 10/2020 | Abajian | G01R 23/16 |

OTHER PUBLICATIONS

International Search Report for International Application No. PCT/US2022/072531, mailed Aug. 25, 2022, 5 pages.
International Written Opinion for International Application No. PCT/US2022/072531, mailed Aug. 25, 2022, 5 pages.

* cited by examiner

*Primary Examiner* — Rexford N Barnie
*Assistant Examiner* — Joseph N Inge
(74) *Attorney, Agent, or Firm* — TraskBritt

(57) ABSTRACT

Object detection in wireless power systems and related system, methods, and devices are disclosed. A controller for a wireless power transmitter includes a measurement voltage potential input terminal and a processing core. The processing core is to determine an average of peak to peak amplitude differences present in sampled measurement voltage potentials for each of the plurality of transmit coils, determine a lowest average of the peak to peak amplitude differences, and select a transmit coil corresponding to the lowest average of the peak to peak amplitude differences to transmit wireless power to a receive coil of a wireless power receiver. A wireless power system includes a tank circuit selectively including any one of a plurality of transmit coils.

20 Claims, 15 Drawing Sheets

TRANSMIT COIL SELECTION RESPONSIVE TO AVERAGE PEAK TO PEAK MEASUREMENT VOLTAGE POTENTIALS AND RELATED APPARATUSES AND METHOD

CROSS-REFERENCE TO RELATED APPLICATION

This application claims the benefit under 35 U.S.C. § 119(e) of U.S. Provisional Patent Application Ser. No. 63/202,035, filed May 24, 2021, and titled "LOW POWER OBJECT DETECTION IN WIRELESS CHARGING SYSTEMS AND RELATED SYSTEMS, METHODS, AND DEVICES," the entire disclosure of which is hereby incorporated herein by reference.

TECHNICAL FIELD

This disclosure relates generally to transmit coil selection responsive to average peak to peak tank circuit voltage potentials, and more specifically to low-power transmit coil selection and foreign object detection in multi-coil wireless charging systems.

BACKGROUND

Wireless power transfer systems may transfer power from one electronic device to another electronic device. More specifically, a transmitter of a transmitting device may generate an electromagnetic field, and a receiver of a receiving device may extract power from the electromagnetic field.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1:
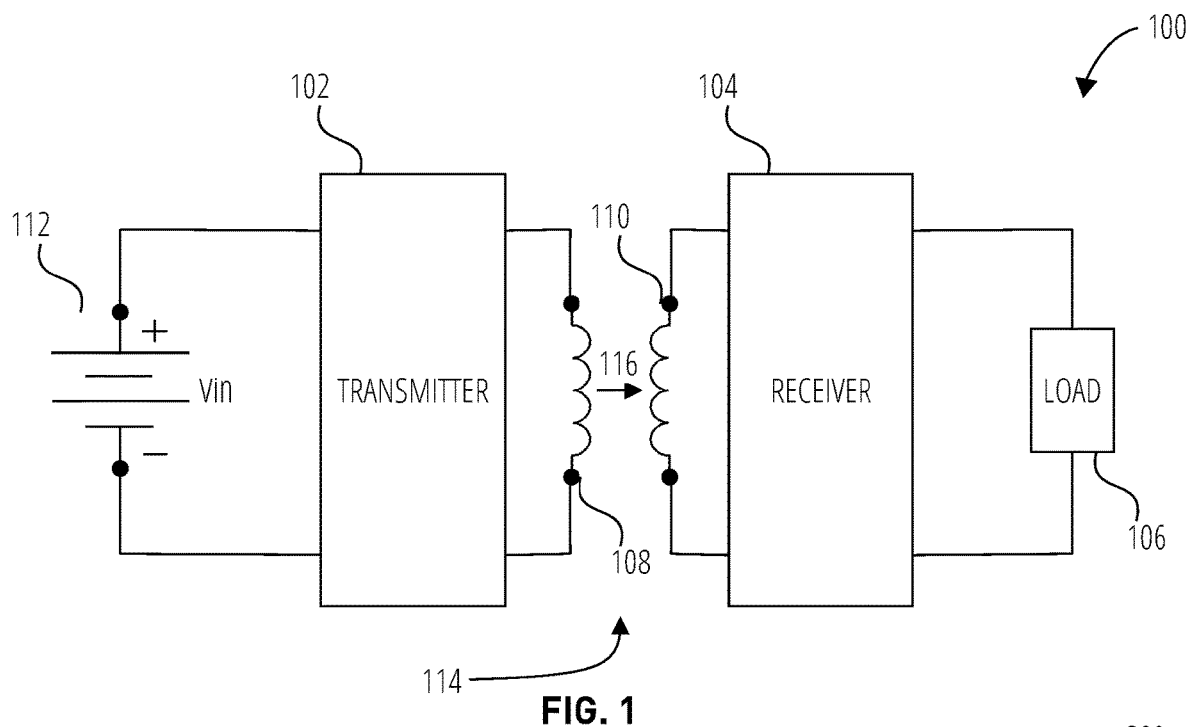
FIG. 1 is a block diagram of a wireless power system including a transmitter and a receiver, according to various examples.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example or this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Wireless power transfer techniques are used to transfer power from one system to another in a wide range of applications. Qi, published by the Wireless Power Consortium, Inc., of Piscataway, New Jersey, is a widely adopted wireless charging standard and it has proliferated into consumer cellular telephone brands.

By way of example, a Qi wireless system includes a transmitter and a receiver. The transmitter controls the power transferred to the receiver based on feedback received from the receiver. The transmitter includes at least one coil with which a receiver coil is coupled in a wireless system. In a multi-coil transmitter design, there are multiple transmitter coils so that the receiver coil can be placed proximate to any of the transmitter coils. This provides spatial freedom for receiver placement and ensures power transfer even with mere approximate placement of the receiver coil proximate to the transmitter. In contrast, single coil transmitters require that the receiver coil be properly aligned with the transmitter coil for power transfer.

One of the functions of the transmitter is to detect the presence of a receiver proximate its coil, or one of its coils. The Qi specification recommends using two methods for receiver detection, namely: (1) analog ping and (2) digital ping. These methods excite the tank circuit with a voltage potential known as a ping voltage, and measure the current in analog ping or detect receiver communication in digital ping, to detect the receiver. This is done periodically to check if a receiver is present. Both these methods, however, consume relatively large amounts of power, which could be an issue with battery powered transmitters. In addition, both of these methods fail to identify the presence of foreign objects, as differentiated from a receiver, proximate to the transmitter. If left undetected, a foreign object may cause the transmitter to treat the foreign object as part of a receiver, which may lead to incorrect power loss calibration and power being radiated to the foreign object, wasting power and potentially heating the foreign object.

Some methods of detecting wireless power receivers and/or foreign objects may not provide reliable detection of wireless power receivers with newer wireless power transmitter topologies. In some examples a wireless power transmitter may include a transmitter surface including one or more transmit coils, and a wireless power receiver may be placed upon the transmitter surface. Reliable detection of object presence on a transmitter surface may be useful, however, for wireless power transfer. Doing so with periodic object scanning using relatively low power would be beneficial. It would also be beneficial to identify which of a plurality of transmit coils has a highest coupling with a receive coil to improve efficiency. It would also be beneficial to distinguish between a receive coil and a foreign object on a transmitter surface.

Disclosed in various examples herein are wireless power transmitters that consume relatively low power as compared with other Qi systems, but that can effectively detect receivers. Accordingly, various methods are enabled based on measurements made in an idle state, during which wireless power is not actively transmitted. Performance of the lower power examples disclosed herein may be similar to those that use analog/digital ping, as specified by the Qi standard, while consuming only a fraction of the power. Also various examples disclosed herein may accurately detect the presence of receivers without false recognition when a receiver is not present.

In various examples a very low power method of reliably detecting a receiver or a foreign object on a transmitter surface is disclosed. In various examples a low voltage is used to compute an average of peak values. In various examples a sleep mode is used for low power consumption between scans. In various examples low power is consumed under standby conditions and performance is improved.

In various examples a resonant tank circuit includes a capacitance of a transmit capacitor and an inductance of a selected one of a plurality of transmit coils. The resonant tank circuit is excited with a low voltage amplitude (e.g., a lower voltage amplitude than that used during active wireless power transmission) or a low duty cycle (e.g., a lower duty cycle than that used during active wireless power transmission). Natural resonance data is captured. Peaks (positive and negative peaks) of captured sinusoidal waveforms are identified. An average of the sum of peaks is computed for each of the coils. Object detection is based on the average of the sum.

In various examples a tank circuit is excited with a very low voltage potential, and several parameters are measured. The measurements may be taken by exciting one coil at a time until all coils have been excited. An amplitude of the voltage potential (e.g., a square wave or a sinusoidal signal) used to excite the coils is low (e.g., 0.25 volts to 1 volt) compared to a ping voltage potential (e.g., 4-7 volts) of the Qi ping approach. The low voltage square wave pulses are applied through an inverter to excite the tank circuit. A predetermined number of pulses applied to the tank circuit may be between eight and one hundred pulses, without limitation. After application of the predetermined number of pulses, the tank circuit resonates at its natural frequency. A measurement voltage potential (e.g., corresponding to the coil voltage or a coil current representation) is sampled at a very high rate (i.e., higher than the Nyquist frequency of the square wave pulses or the sinusoidal signal provided to the transmit coil, such as at 2 megahertz) by an analog to digital converter (ADC) and the samples are stored in an array. The samples are processed to find the peaks of the decaying measurement voltage potential at the tank circuit. The peaks can be used to determine an average peak to peak amplitude (e.g., a difference between an average of positive peaks and an average of negative peaks). This may be done separately for each of the transmitter coils, which may include three coils, without limitation. The coil average peak to peak amplitudes are compared against each other to find a lowest coil average peak to peak amplitude. The lowest coil average peak to peak amplitude is compared with a preset average threshold value, which may be used to detect the receiver coil accurately. The selected coil is then used to communicate with the receiver and proceed to power transfer phase (i.e., transmit wireless power to the receiver).

It is noted that average peak to peak amplitudes may be used to reliably detect the presence of a receiver. Also, metal foreign objects placed in proximity to the transmitter without a wireless power receiver present may be detected without a separate foreign object detection system. If a foreign object is detected the wireless power transmitter may refrain from transmitting power to avoid transmitting power to the foreign object. In contrast, analog/digital ping methods may result in transmission of power to foreign objects if a separate foreign object detection method is not employed. Accordingly, not only do various examples of the present disclosure enable lower power receiver coil detection as compared to analog/digital ping methods, examples disclosed herein enable reliable detection of foreign objects without the use of any additional foreign object detection method resulting in even more power savings (because a separate foreign object detection system is not being powered) and the use of less chip area (because a separate foreign object detection system is not implemented).

Various examples disclosed herein may be used to reliably detect the presence of a receiver. Various examples disclosed herein also detect the presence of any unwanted metal foreign objects placed in proximity to the transmitter without a receiver being present.

A drastic reduction in the power consumption, as compared to Qi systems of the prior art, may be achieved if a controller of the wireless power transmitter is put into sleep mode after computations between object detection operations, then woken up after a certain delay. For example, the controller may be put into sleep mode after performing computations associated with object detection and woken up from sleep mode after a predetermined delay.

Object detection according to various examples disclosed herein may involve transmit coil voltage potential sensing to detect a natural response of a resonant tank circuit. Various examples disclosed herein may be implemented using simple hardware on a printed circuit board. A software algorithm may analyze change in an average of peak to peak amplitude values of a measurement voltage potential proportional to the transmit coil voltage potential. Calibration may be used for each wireless power transmitter. Low power excitation may be used to detect a transmit coil with a strongest coupling to a receive coil and to detect foreign objects in the absence of a receive coil.

Although various examples disclosed herein are disclosed with reference to wireless power transmitters, the present disclosure is not so limited. Various examples disclosed herein may also be used in other applications using in-band communication.

In various examples a controller for a wireless power transmitter includes a measurement voltage potential input terminal and a processing core. The measurement voltage potential input terminal is to receive a measurement voltage potential responsive to a tank circuit signal at a tank circuit of the wireless power transmitter. The tank circuit selectively includes any one of a plurality of transmit coils. The processing core is to determine an average of peak to peak amplitude present in sampled measurement voltage potentials for each of the plurality of transmit coils, and determine a lowest average peak to peak amplitude. The processing core also selects a transmit coil corresponding to the lowest average of the peak to peak amplitude differences from the plurality of transmit coils to transmit wireless power to a receive coil of a wireless power receiver responsive to a determination that the lowest average of the peak to peak amplitude differences is between a first predetermined threshold value and a second predetermined threshold value.

In various examples a wireless power transmitter includes a tank circuit and a controller. The tank circuit includes a transmit capacitor and selectively includes any one of a plurality of transmit coils selectively electrically connected to the transmit capacitor. The controller is to select one of the plurality of transmit coils to use to transmit wireless power responsive to average amplitude differences between positive peaks and negative peaks of a measurement voltage potential for each of the plurality of transmit coils. The measurement voltage potential is proportional to a tank circuit voltage potential of the tank circuit responsive to discharge of the tank circuit.

In various examples a method of detecting an object includes determining a lowest average of peak to peak amplitude differences corresponding to a plurality of transmit coils and determining that nothing is proximate to the plurality of transmit coils responsive to a determination that the lowest average of the peak to peak amplitude differences is not less than a first predetermined threshold value. The method also includes determining that a foreign object is proximate to the plurality of transmit coils responsive to a determination that the lowest average of the peak to peak amplitude differences is less than the first predetermined threshold value and less than a second predetermined threshold value. The method includes selecting a transmit coil corresponding to the lowest average of the peak to peak amplitude differences to transmit wireless power to a receive coil responsive to a determination that the lowest average of the peak to peak amplitude differences is less than the first predetermined threshold value and not less than the second predetermined threshold value.

FIG. 1 is a block diagram of a wireless power system 100 including a transmitter 102 and a receiver 104, according to various examples of the disclosure. Transmitter 102 is operably coupled to a voltage source 112 (e.g., a direct current (DC) voltage source such as a battery) to provide an input voltage potential Vin, and receiver 104 is coupled to a load 106. Wireless power system 100 includes a plurality of transmit coils 108 (of which one is shown, and are sometimes referred to herein as "transmit coil 108") and a receive coil 110, which may be used to transfer power 116 from transmitter 102 to receiver 104 (e.g., via inductive coupling). When transmit coil 108 is in proximity with receive coil 110 the transmit coil 108 and the receive coil 110 may be coupled coils 114 (e.g., at least one of the transmit coils 108 may be inductively coupled to the receive coil 110). No physical connection is required between the transmitter 102 and the receiver 104 to transfer power 116 from the transmitter 102 to the receiver 104. Rather, the power 116 is transferred using magnetic flux linkage. The transmitter 102 may control the power 116 transferred by controlling a voltage potential amplitude, frequency, phase, and/or duty cycle provided to the transmit coil 108.

Power transmission may be efficient when one of the transmit coils 108 is properly aligned with receive coil 110. The transmitter 102 is to use one of the transmit coils 108 that has a strongest coupling with the receive coil 110 to transmit the power 116 to the receiver 104. The transmitter 102 may detect the presence of the receive coil 110 or some other conductive foreign object. Also, if the receive coil 110 is detected, the transmitter 102 may select one of the transmit coils 108 (e.g., the transmit coil with the strongest coupling to the receive coil 110) to transmit the power 116 to the receive coil 110, as is discussed in more detail below.

Figure 2:
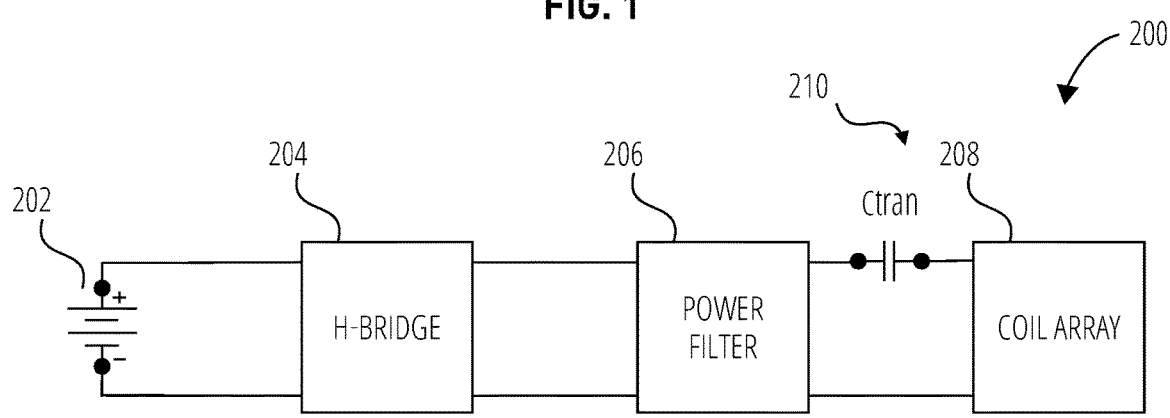
FIG. 2 is a block diagram of a transmitter, which is an example of the transmitter of FIG. 1, according to various examples.

FIG. 2 is a block diagram of a transmitter 200, which is an example of a transmitter 102 of FIG. 1, according to various examples. The transmitter 200 includes an H-bridge 204 (e.g., a MOSFET H-bridge inverter), which may be controlled by a microcontroller or other control circuit. The transmitter 200 also includes a power filter 206, a transmit capacitor Ctran, and a coil array 208. The power filter 206 may include an inductive-capacitive (LC) filter (i.e., a filter including both inductive and capacitive components). The power filter 206 is to filter out high frequency components from a square wave output provided by the H-bridge 204.

A resonant tank circuit 210 includes the transmit capacitor Ctran and a selected coil from the coil array 208. Since the power filter 206 is to filter out the high frequency components of a square wave provided by the H-bridge 204, the power filter 206 is to drive the resonant tank circuit 210 with a substantially sinusoidal waveform.

The coil array 208 may include any number of transmit coils (e.g., the transmit coils 108 of FIG. 1). By way of non-limiting example, the coil array 208 may include three overlapping transmitter coils. The use of multiple overlapping transmitter coils enables the transmitter 200 to select one of the overlapping transmitter coils that is best aligned with a receive coil. The input voltage potential to the H-bridge 204 may be received directly from a DC voltage source 202 or from an output of a four-switch buck boost converter (FSBBC), which may control the amplitude of a voltage potential provided to the H-bridge 204.

Figure 3:
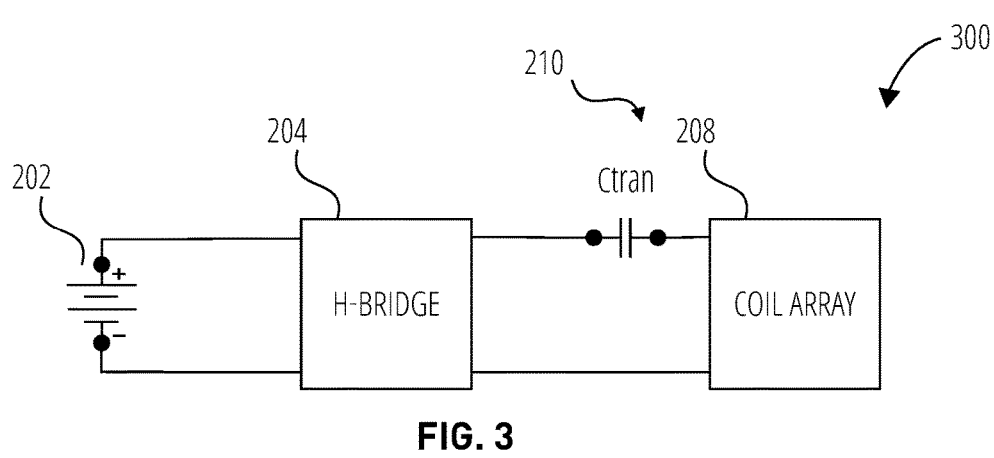
FIG. 3 is a block diagram of a transmitter, which is another example of the transmitter of FIG. 1, according to various examples.

FIG. 3 is a block diagram of a transmitter 300, which is another example of the transmitter 102 of FIG. 1, according to various examples. The transmitter 300 is similar to the transmitter 200 of FIG. 2. For example, the transmitter 300 includes the DC voltage source 202, the H-bridge 204, and the resonant tank circuit 210 (including the transmit capacitor Ctran and the coil array 208) discussed above with reference to FIG. 2. The transmitter 300, however, does not include the power filter 206 discussed above with reference to FIG. 2. Accordingly, the resonant tank circuit 210 may be electrically connected to the H-bridge 204 without an intervening power filter in between.

Figure 4:
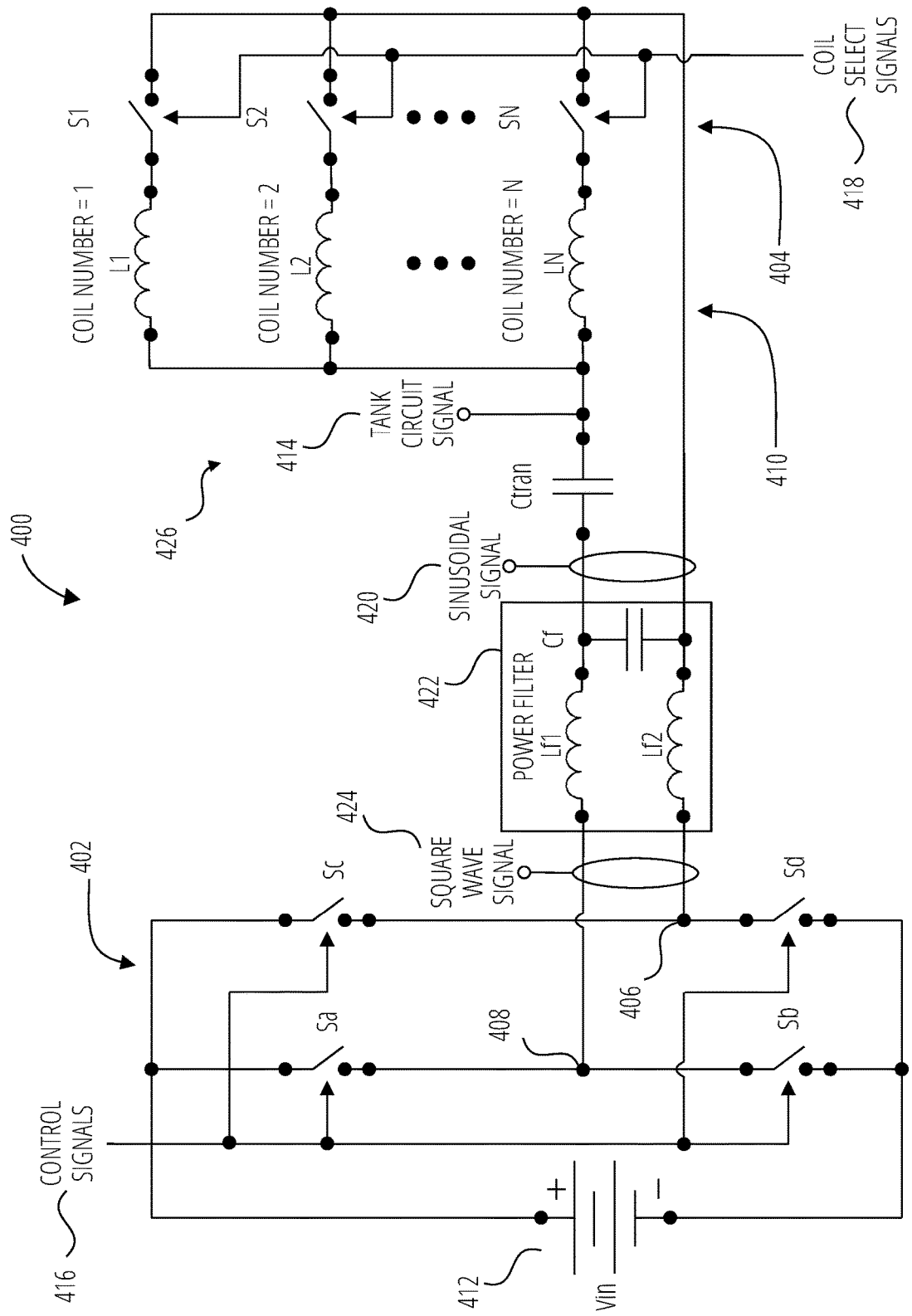
FIG. 4 is a schematic illustration of a segment of a wireless power transmitter (e.g., the transmitter of FIG. 1, the transmitter of FIG. 2), according to various examples.

FIG. 4 is a schematic illustration of a segment 400 of a wireless power transmitter (e.g., the transmitter 102 of FIG. 1, the transmitter 200 of FIG. 2), according to various examples. The segment 400 includes a voltage source 412 (an example of the voltage source 112 of FIG. 1 and the DC voltage source 202 of FIG. 2), an H-bridge inverter 402 (an example of the H-bridge 204 of FIG. 2), a power filter 422 (an example of the power filter 206 of FIG. 2), and a tank circuit 426 (an example of the resonant tank circuit 210 of FIG. 2).

An input of the H-bridge inverter 402 is illustrated in FIG. 4 as being electrically connected to the voltage source 412. It should be noted, however, that in some examples the input of the H-bridge inverter 402 may instead be electrically connected to an output of a converter (not shown) (e.g., a DC to DC converter such as a four-switch buck boost converter (FSBBC), without limitation). The H-bridge inverter 402 includes four switches Sa, Sb, Sc, and Sd, as shown in FIG. 4. Switches Sa, Sb, Sc, and Sd are electrically controllable via control signals 416 from a controller (e.g., a microcontroller) to generate a square wave signal 424 across a first node 408 and a second node 406 of the H-bridge inverter 402.

By way of non-limiting example, the switches Sa, Sb, Sc, and Sd may be transistors having the control signals 416 provided to their gates. In some examples switches Sa, Sb, Sc, and Sd may be metal-oxide-semiconductor field effect transistors (MOSFETs) driven by MOSFET drivers. A controller may disable, or turn off, the square wave signal 424 by de-asserting the control signals 416 at each of the switches Sa, Sb, Sc, and Sd (i.e., providing a voltage potential to open the switch). With the control signals 416 disabled the first node 408 and the second node 406 may be in an electrically floating state. A controller may activate the square wave signal 424 by alternating between: closing switches Sa and Sd while opening switches Sc and Sb; and opening switches Sa and Sd while closing switches Sc and Sb. Switches Sa, Sb, Sc, and Sd may be closed by asserting the respective control signals 416. The control signals 416 provided by a controller may include a bus of signals to control the switches Sa, Sb, Sc, and Sd. In some non-limiting examples a single signal of the control signals 416 may control switches Sa and Sd and another signal may control switches Sc and Sd. In various examples the control signals 416 may include four separate signals to control the switches Sa, Sb, Sc, and Sd separately. In various examples MOSFET driver inputs (not shown) of MOSFET drivers (not shown) electrically coupled between a controller and the switches Sa, Sb, Sc, and Sb are controlled by the control signals 416, which may be provided by pulse-width modulation (PWM) outputs from PWM output pins of the controller, without limitation.

With switches Sa and Sd closed and switches Sb and Sc open the voltage potential across first node 408 and second node 406 may be substantially Vin, resulting in a positive half cycle of the square wave signal 424. With switches Sa and Sd open and switches Sb and Sc closed the voltage potential across first node 408 and second node 406 may be −Vin, resulting in a negative half cycle of the square wave signal 424. Accordingly, with alternation between these two states the square wave signal 424 across first node 408 and second node 406 results. By way of non-limiting example, a frequency of operation (i.e., a switching frequency, which in turn amounts to a frequency of the square wave signal 424) may be set to substantially 120 kHz. The H-bridge inverter 402 applies the square wave signal 424 to the power filter 422.

The power filter 422 of FIG. 4 is a second order LC filter. The power filter 422 includes a first filter inductor LF1 having a respective first end electrically connected to the first node 408 and a second filter inductor Lf2 having a respective first end electrically connected to the second node 406. The power filter 422 also includes a filter capacitor Cf electrically connecting from a respective second end of the first filter inductor Lf1 to a respective second end of the second filter inductor Lf2 on a tank circuit 426 side of the segment 400. The power filter 422 is to filter out high frequency components of the square wave signal 424. By way of non-limiting example, the power filter 422 is to apply a sinusoidal signal 420 across the tank circuit 426 responsive to the square wave signal 424.

The tank circuit 426 includes a capacitance of a transmit capacitor Ctran and an inductance of the transmit coils 410 (e.g., the transmit coils 108 of FIG. 1, the coil array 208 of FIG. 2). The transmit coils 410 include transmit coils L1, L2, ..., LN corresponding to coil numbers 1, 2, ..., and N. The tank circuit 426 also includes coil switches 404 (coil switches S1, S2, ..., SN), respectively electrically connected serially with a respective transmit coil L1, L2, ..., LN. The number N of the transmit coils 410 and the coil switches 404 may be any number (e.g., two, three, four, five, ten, twenty, without limitation).

The coil switches 404 are electrically controllable to enable a controller to selectively open and close the coil switches 404 via coil select signals 418. By closing one of the coil switches 404 associated with one of the transmit coils 410, the associated one of the transmit coils 410 is effectively placed in the tank circuit 426. In some examples, only one of the transmit coils 410 is selected at a time (e.g., by closing the associated one of the coil switches 404). In some examples the coil switches 404 may be transistors (e.g., back-to-back MOSFETs for conducting bidirectional current, i.e., alternating current (AC) in the tank circuit 426) having gates receiving the coil select signals 418. Accordingly, the coil select signals 418 provided by a controller may include a bus of signals to individually control the coil switches 404. The sinusoidal signal 420 from the power filter 422 is applied across the tank circuit 426.

A tank circuit signal 414 may be measured (e.g., by a controller) during operation of the segment 400 to detect a presence of a wireless power receiver in proximity to the transmit coils 410, as is discussed in more detail below. The tank circuit signal 414 may also be used to detect the presence of foreign objects, as is also discussed in more detail below.

Figure 5:
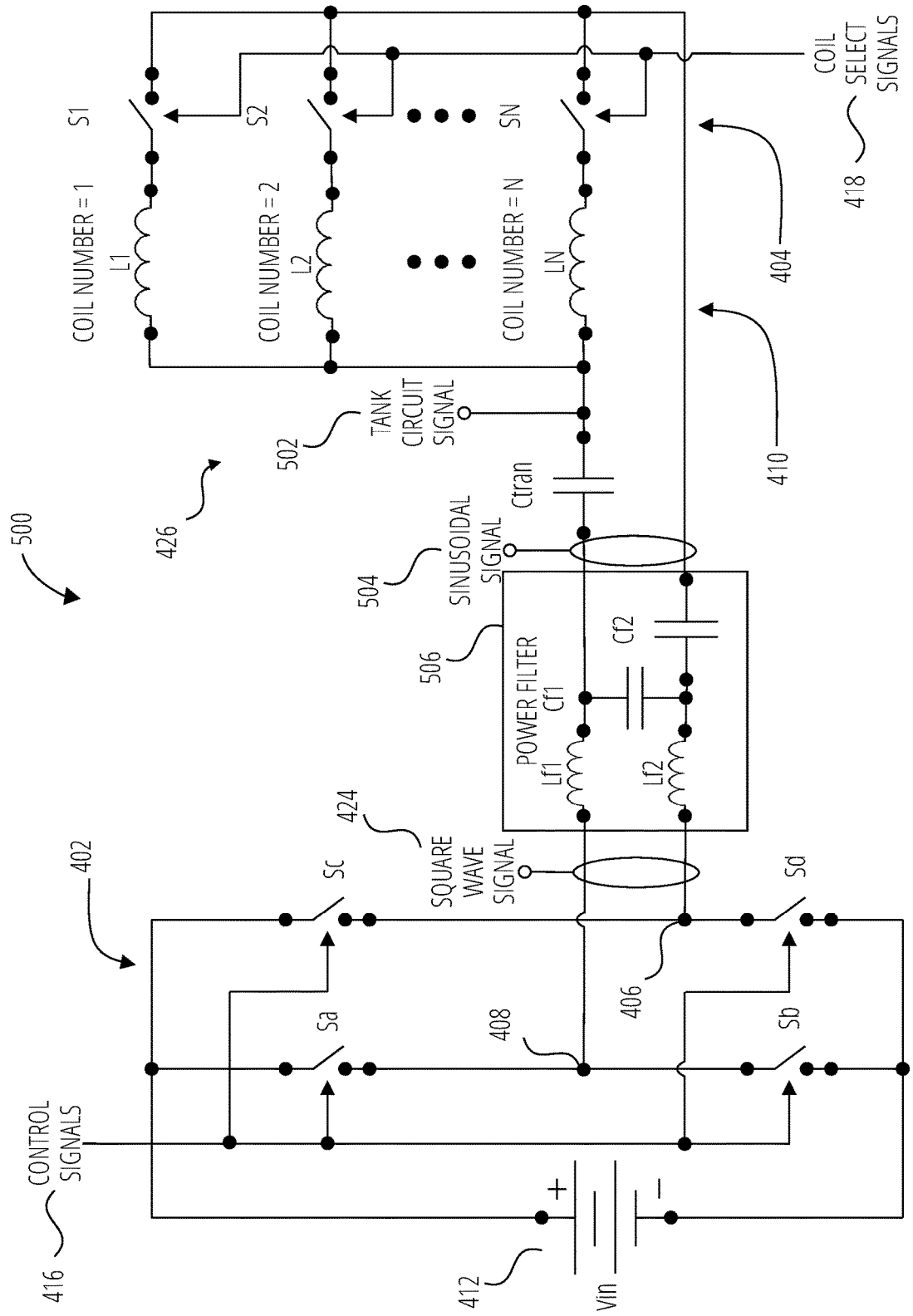
FIG. 5 is a schematic illustration of a segment of another wireless power transmitter (e.g., the transmitter of FIG. 1, the transmitter of FIG. 2), according to various examples.

FIG. 5 is a schematic illustration of a segment 500 of another wireless power transmitter (e.g., the transmitter 102 of FIG. 1, the transmitter 200 of FIG. 2), according to various examples. The segment 500 includes the voltage source 412, the H-bridge inverter 402, and the tank circuit 426 discussed above with reference to FIG. 4. The segment 500, however, includes a power filter 506 (e.g., an example of the power filter 206 of FIG. 2) that is different from the power filter 422 of FIG. 4. The power filter 506 includes a first filter inductor electrically connected to the first node 408 and a second filter inductor electrically connected to the second node 406, similar to the power filter 422 of FIG. 4. The power filter 506 also includes a first filter capacitor Cf1 having a respective first end electrically connected to the respective second end of first filter inductor Lf1 and a respective second end connected to the respective second end of the second filter inductor Lf2 on a tank circuit 426 side of the power filter 506. The power filter 506 optionally includes a second filter capacitor Cf2 electrically connected to the respective second end of the second filter inductor Lf2 between the second filter inductor Lf2 and the coil switches 404 of the tank circuit 426. If the second filter capacitor Cf2 is used, the value of the capacitance of transmit capacitor Ctran may be substantially the same as the value of the capacitance of second filter capacitor Cf2 (e.g., both Cf2 and Ctran may be substantially two times greater than a total effective capacitance Ct), and selected so as to result in the desired total effective capacitance of Ct since the total effective capacitance is the series combination of Ctran with Cf2. If Cf2 is absent, the value of Ctran may be 200 nF for MPA-13. Also by way of non-limiting example, if Cf2 is used, the value of Ctran and of Cf2 may be 400 nF, which would result in a total effective capacitance of 200 nF.

The power filter 506 may provide a sinusoidal signal 504 across the tank circuit 426 responsive to the square wave signal 424 from the H-bridge inverter 402. In operation, a tank circuit signal 502 may be measured and used to detect wireless power receivers and foreign objects.

Figure 6:
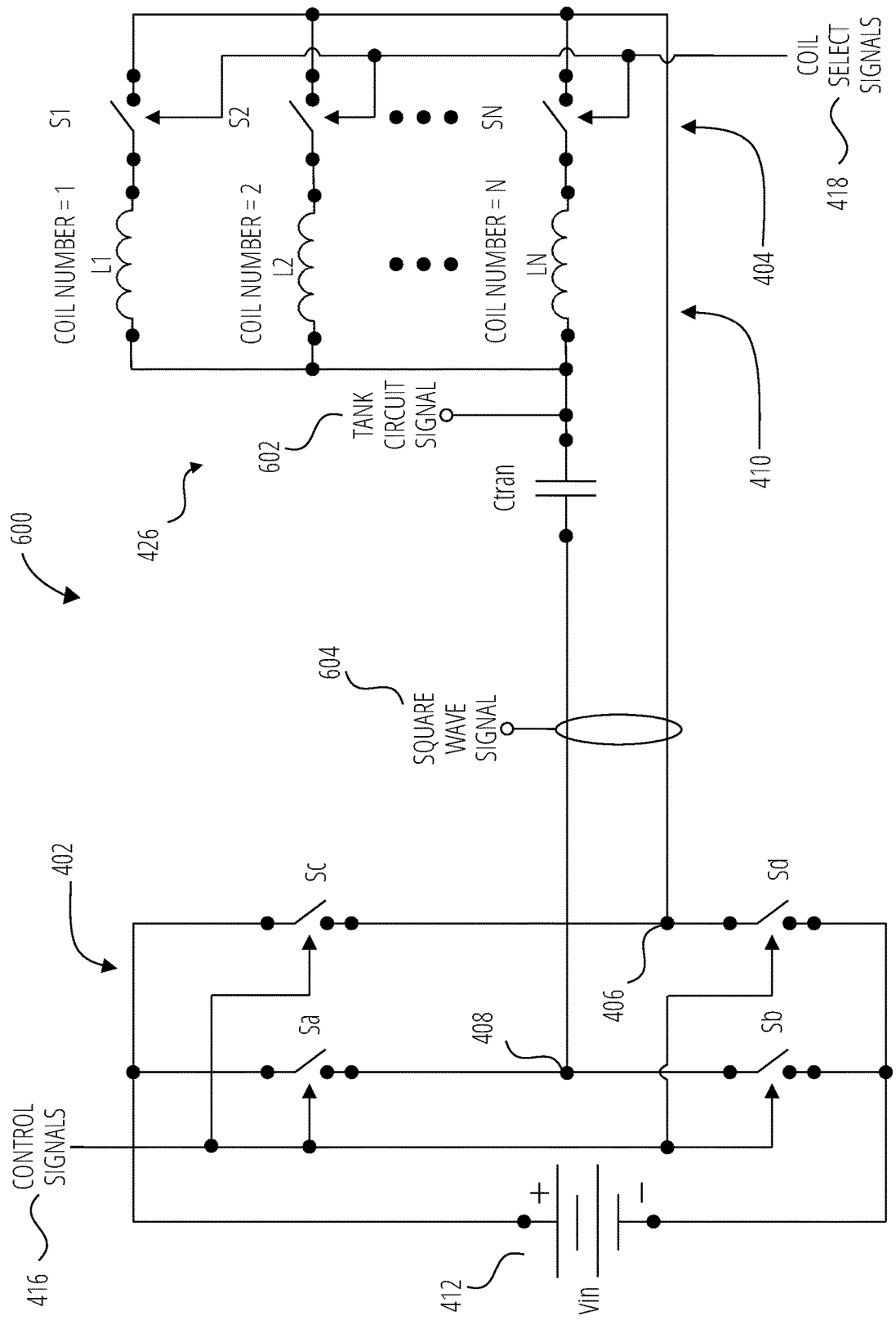
FIG. 6 is a schematic illustration of a segment of another wireless power transmitter (e.g., the transmitter of FIG. 1, the transmitter of FIG. 3), according to various examples.

FIG. 6 is a schematic illustration of a segment 600 of another wireless power transmitter (e.g., the transmitter 102 of FIG. 1, the transmitter 300 of FIG. 3), according to various examples. The segment 600 includes the voltage source 412, the H-bridge inverter 402, and the tank circuit 426 discussed above with reference to FIG. 4. The segment 600, however, does not include a power filter such as the power filter 422 of FIG. 4 or the power filter 506 of FIG. 5. Accordingly, the tank circuit 426 is electrically connected to the H-bridge inverter 402. Since the segment 600 does not include a power filter, the H-bridge inverter 402 may provide a square wave signal 604 across the tank circuit 426. In operation a tank circuit signal 602 may be measured and used to detect wireless power receivers and foreign objects.

Figure 7:
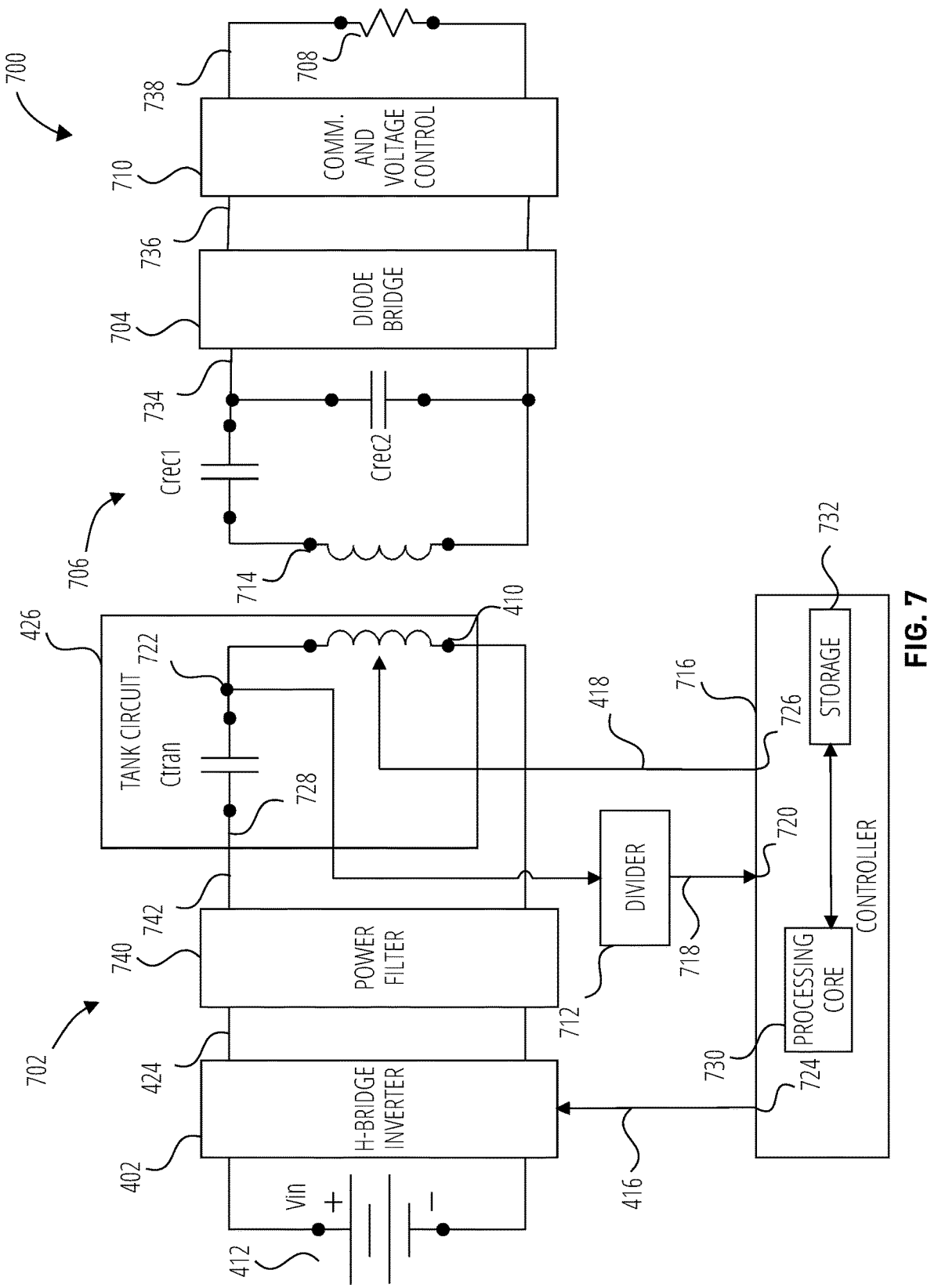
FIG. 7 is a block diagram of a wireless power system, according to various examples.

FIG. 7 is a block diagram of a wireless power system 700, according to various examples. The wireless power system 700 includes a transmitter 702 (an example of the transmitter 102 of FIG. 1 or the transmitter 200 of FIG. 2, without limitation), a receiver 706, a selected one of the transmit coils 410 of FIG. 4 and FIG. 5 (e.g., selected using the coil select signals 418 of FIG. 4 and FIG. 5), a receive coil 714 (e.g., the receive coil 110 of FIG. 1), the voltage source 412 of FIG. 4 and FIG. 5, and a load 708 (e.g., the load 106 of FIG. 1). As illustrated in FIG. 7, the transmitter 702 includes the H-bridge inverter 402 of FIG. 4 and FIG. 5, a power filter 740 (e.g., the power filter 206 of FIG. 2, the power filter 422 of FIG. 4, the power filter 506 of FIG. 5), the tank circuit 426 of FIG. 4 and FIG. 5, and a controller 716. The H-bridge inverter 402 is electrically connected between the voltage source 412 and the power filter 740. The power filter 740 is electrically connected between the H-bridge inverter 402 and the tank circuit 426. The tank circuit 426 includes the transmit coils 410 and the transmit capacitor Ctran of FIG. 4 and FIG. 5 electrically connected in series between the selected one of the transmit coils 410 and the power filter 740.

The controller 716 includes a processing core 730 electrically connected to one or more data storage devices (storage 732). The controller 716 also includes a measurement voltage potential input terminal 720 to receive a measurement voltage potential 718 responsive to a tank circuit signal 722 (e.g., a tank circuit voltage potential such as the tank circuit signal 414 of FIG. 4 and the tank circuit signal 502 of FIG. 5 or a tank circuit current) at the tank circuit 426 (e.g., taken between the transmit capacitor Ctran and the selected one of the transmit coils 410, without limitation). By way of non-limiting example, the transmitter 702 may include a divider 712 to receive the tank circuit signal 722 and provide the measurement voltage potential 718. Also by way of non-limiting example, in instances where the tank circuit signal 722 includes a tank circuit voltage potential the divider 712 may include a voltage divider circuit and a unity gain operational amplifier buffer (not shown). In such examples the voltage divider circuit may include a pair of series connected resistors electrically connected between the node the tank circuit signal 722 is taken from and a reference voltage node such as a power supply return node (e.g., Vss or ground, without limitation). The unity gain operational amplifier buffer includes an input terminal electrically connected to a node between the series connected resistors and an output electrically connected to the measurement voltage potential input terminal 720. Alternatively, in examples where the tank circuit signal 722 is a tank circuit current the divider 712 may include a current transformer (CT) for coil current measurement. In such examples the CT may convert the tank circuit signal 722 from a current to the measurement voltage potential 718. Accordingly, the measurement voltage potential 718 may be representative of a coil voltage potential or a coil current of the selected one of the transmit coils 410, according to various examples.

The controller 716 includes a coil select output terminal 726 to provide one or more coil select signals 418 to the transmit coils 410. The coil select signals 418 are to selectively control which of the transmit coils 410 conducts a sinusoidal signal 742 provided to the tank circuit 426 (responsive to a square wave signal 424 provided to the power filter 740). The controller 716 also includes an AC control output terminal 724 to provide one or more control signals 416 to the H-bridge inverter 402. The control signals 416 are to generate, and control, the square wave signal 424 and as a result the sinusoidal signal 742 applied to the tank circuit 426. For example, with the H-bridge inverter 402 and the power filter 740 electrically connected between the voltage source 412 and the tank circuit 426, the controller 716 may selectively apply the control signals 416 to convert the input voltage potential Vin (e.g., a DC voltage potential) provided by the voltage source 112 to a square wave signal 424 (e.g., by periodically inverting the input voltage Vin). The power filter 740 may convert the square wave signal 424 to the sinusoidal signal 742.

Operations performed by the processing core 730, which is a component of the controller 716, may be interchangeably described as being performed by the controller 716 herein. The processing core 730 of the controller 716 is to control the coil select signals 418 to pass the sinusoidal signal 742 through respective ones of the transmit coils 410, one at a time. For example, the processing core 730 may control the H-bridge inverter 402 to apply the sinusoidal signal 742 to the tank circuit 426 with each of the transmit coils 410 connected one at a time for a predetermined period of time (e.g., for a predetermined number of periods of the sinusoidal signal 742 such as eight to one hundred periods, corresponding to eight to one hundred pulses of the square wave signal 424). Following the application of the sinusoidal signal 728 to each of the transmit coils 410, the processing core 730 may sample (e.g., at a very high sample rate such as 10 megahertz) the measurement voltage potential 718.

Figure 12:
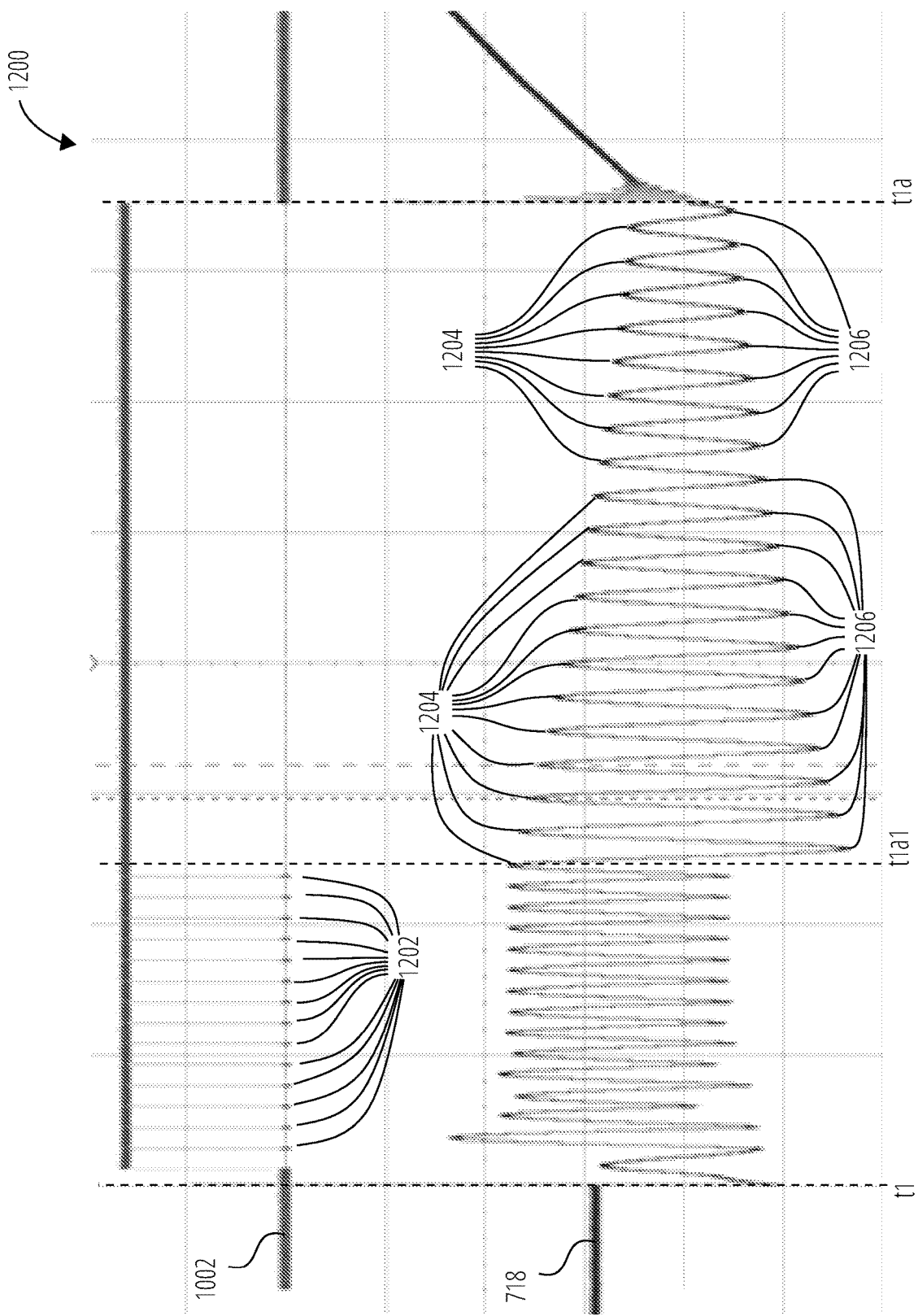
FIG. 12 is a plot illustrating example voltage potentials of the transmitter of the wireless power system illustrated in FIG. 7 during a data collection operation of the object detection operation.

The measurement voltage potential 718 may be a decaying sinusoidal waveform (see the measurement voltage potential 718 between time t1a1 and t1a in FIG. 12) with a resonant frequency fr. Based on the sampled measurement voltage potential 718 for each of the transmit coils 410, the processing core 730 is to determine peaks (extrema such as minimums, maximums, or both) of the measurement voltage potential 718. The processing core 730 may determine an average peak to peak amplitude for each of the transmit coils 410. The processing core 730 may also detect the presence of the receiver 706, a foreign object, or both using the average peak to peak amplitude for the selected one of the transmit coils 410.

In operation, the processing core 730 may periodically perform an object detection operation. If no receive coil 714 is detected (i.e., a conductive foreign object or no object is detected) the processing core 730 may transition the controller 716 to a low power mode such as a sleep mode or a standby mode. If, however, the processing core 730 detects a receive coil 714 the processing core 730 may select one of the transmit coils 410 to transmit power 116 (FIG. 1) to the receive coil 714. The selection of which of the transmit coils 410 to use may be made based on at least the average values of the peaks for the respective transmit coils 410.

The receiver 706 includes a resonant tank circuit (not shown) formed by the receive coil 714 and the receive capacitors Crec1 and Crec2 shown in FIG. 7. Accordingly, the receiver 706 may include receive capacitors Crec1 and Crec2, a diode bridge 704, and communication and voltage control circuitry 710. The receive capacitor Crec1 may be electrically connected in series between one end of the receive coil 714 and the diode bridge 704, and may have a larger capacitance value than that of Crec2. The receive capacitor Crec2 may be electrically coupled in parallel across the diode bridge 704. The diode bridge 704 may rectify a received signal 734 received from the receive coil 714 whose energy is provided by the transmitter 702 to provide a direct current (DC) power signal 736. Accordingly, the output of the resonant tank circuit of the receiver 706 is passed through the diode bridge 704, which rectifies the received signal 734 to produce the DC power signal 736. The communication and voltage control circuitry 710 may receive the DC power signal 736 and produce a load voltage potential 738 to the load 708. By way of non-limiting example, the communication and voltage control circuitry 710 may include a buck converter or low-dropout regulator (LDO), which provides a fixed load voltage potential 738 at the load 708. The communication and voltage control circuitry 710 may be implemented in a controller (e.g., microcontroller), without limitation.

Figure 8:
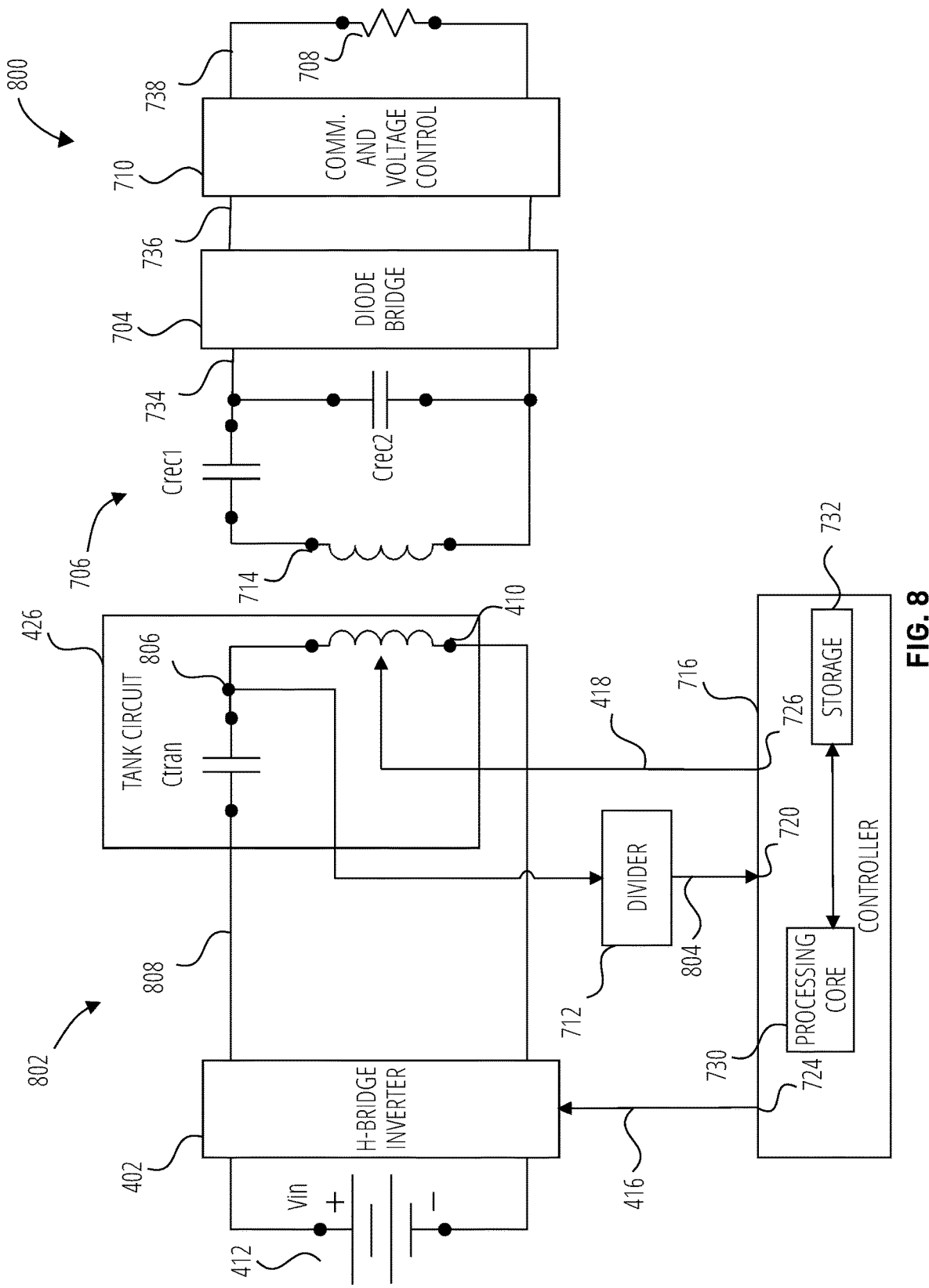
FIG. 8 is a block diagram of another wireless power system, according to various examples.

FIG. 8 is a block diagram of another wireless power system 800, according to various examples. The wireless power system 800 includes a transmitter 802 (an example of the transmitter 102 of FIG. 1 or the transmitter 300 of FIG. 3, without limitation), the receiver 706 discussed above with reference to FIG. 7, a selected one of the transmit coils 410 of FIG. 6 (e.g., selected using the coil select signals 418 of FIG. 6), the receive coil 714 discussed with reference to FIG. 7, the voltage source 412 of FIG. 6, and the load 708 discussed with reference to FIG. 7. The transmitter 802 is similar to the transmitter 702 of FIG. 7. As illustrated in FIG. 8, the transmitter 802 includes the H-bridge inverter 402, the tank circuit 426, and the controller 716. The H-bridge inverter 402 is electrically connected between the voltage source 412 and the tank circuit 426. In contrast to the transmitter 702 of FIG. 7, however, the transmitter 802 does not include the power filter 740 of FIG. 7. Rather, the tank circuit 426 is electrically connected to the H-bridge inverter 402. The tank circuit 426 includes the transmit coils 410 and the transmit capacitor Ctran, which transmit capacitor Ctran is electrically connected in series between the transmit coils 410 and the H-bridge inverter 402. The H-bridge inverter 402 provides a square wave signal 808 to the tank circuit 426.

As discussed above with reference to FIG. 7, the controller 716 includes the processing core 730 electrically connected to storage 732. The controller 716 also includes the measurement voltage potential input terminal 720 to receive a measurement voltage potential 804 responsive to a tank circuit signal 806 (e.g., a tank circuit voltage potential such as the tank circuit signal 414 of FIG. 6 or a tank circuit current) at the tank circuit 426 (e.g., taken between the transmit capacitor Ctran and the selected one of the transmit coils 410, without limitation). By way of non-limiting example, the transmitter 802 may include the divider 712 to receive the tank circuit signal 806 and provide the measurement voltage potential 804.

The controller 716 provides, through the coil select output terminal 726, the one or more coil select signals 418 to the transmit coils 410. The coil select signals 418 are to selectively control which of the transmit coils 410 conducts the square wave signal 808 provided to the tank circuit 426. The controller 716 also provides, through the AC control output terminal 724, the one or more control signals 416 to the H-bridge inverter 402. The control signals 416 are to control the square wave signal 808 applied to the tank circuit 426. For example, with the H-bridge inverter 402 electrically connected between the voltage source 412 and the tank circuit 426, the controller 716 may selectively apply the control signals 416 to convert the input voltage potential Vin (e.g., a DC voltage potential) provided by the voltage source 112 to the square wave signal 808 (e.g., by periodically inverting the input voltage Vin).

The processing core 730 of the controller 716 is to control the coil select signals 418 to provide the square wave signal 808 to the transmit coils 410 one at a time. For example, the processing core 730 may control the H-bridge inverter 402 to apply the square wave signal 808 to the tank circuit 426 so as to pass through respective ones of the transmit coils 410 one at a time for a predetermined period of time (e.g., for a predetermined number of periods of the square wave signal 808 such as eight to one hundred periods). Following the application of the square wave signal 808 to respective ones of the transmit coils 410, the processing core 730 may sample (e.g., at a very high sample rate such as 10 megahertz) the measurement voltage potential 804.

The measurement voltage potential 804 may be a decaying sinusoidal waveform with a resonant frequency fr. Based on the sampled measurement voltage potential 804 for respective ones of the transmit coils 410, the processing core 730 is to determine peaks (extrema such as minimums, maximums, or both) of the measurement voltage potential 804. The processing core 730 may determine an average value of amplitudes of the peaks for each of the transmit coils 410. The processing core 730 may also detect the presence of the receiver 706, a foreign object, or both using the average values of the peaks for the transmit coils 410.

In operation, the processing core 730 may periodically perform an object detection operation. If no receive coil 714 is detected (i.e., a conductive foreign object or no object is detected) the processing core 730 may transition the controller 716 to a low power mode such as a sleep mode or a standby mode. If, however, the processing core 730 detects a receive coil 714, the processing core 730 may select one of the transmit coils 410 to transmit power 116 (FIG. 1) to the receive coil 714. The selection of which of the transmit coils 410 to use may be made based on at least the average values of the peaks for the transmit coils 410.

Figure 9:
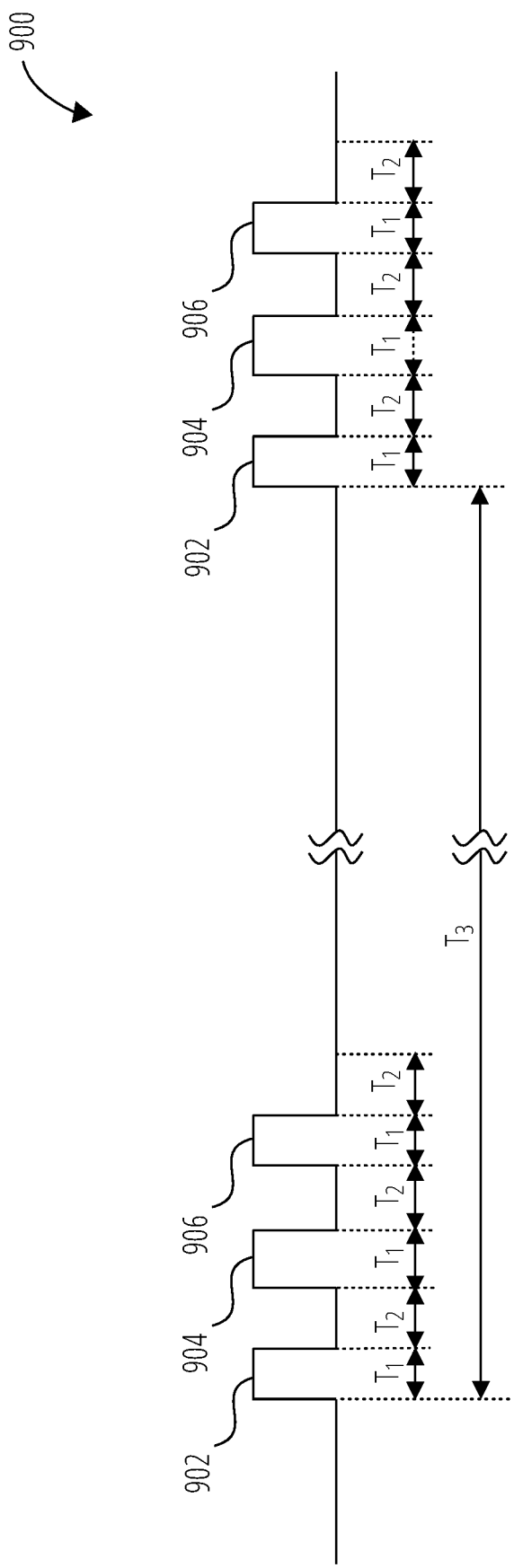
FIG. 9 is a signal timing diagram of a coil selection representation for control signals of FIG. 7, according to various examples.

FIG. 9 is a signal timing diagram of a coil selection representation 900 for coil select signals 418 of FIG. 7, according to various examples. The controller 716 (FIG. 7) may periodically excite the transmit coils 410 (FIG. 4, FIG. 5, and FIG. 7), one by one, by periodically activating the control signals 416 (FIG. 4, FIG. 5, and FIG. 7) and selecting a respective one of the transmit coils 410 by closing the associated respective coil switch 404. The coil selection representation 900 includes a coil 1 activation 902 during which transmit coil L1 (FIG. 4 and FIG. 5) of the transmit coils 410 is activated. During the coil 1 activation 902 a coil switch S1 (FIG. 4 and FIG. 5) of coil switches 404 corresponding to transmit coil L1 may be closed and the other coil switches S2, . . . , and SN of coil switches 404 may be opened responsive to coil select signals 418 (FIG. 4, FIG. 5, and FIG. 7) from a controller 716 (FIG. 7). Also, during the coil 1 activation 902 the controller 716 may pulse the control signals 416 using pulse width modulation to generate the square wave signal 424 at output terminals (first node 408 and second node 406 of FIG. 4 and FIG. 5) of the H-bridge inverter 402 for a predetermined number Np of pulses. Responsive to the square wave signal 424, the power filter 740 may provide the sinusoidal signal 420 (FIG. 4, FIG. 5, and FIG. 7) to the tank circuit 426 (FIG. 4, FIG. 5, and FIG. 7). In examples where no power filter is used (e.g., FIG. 3, FIG. 6, and FIG. 8) the square wave signal 604 (FIG. 6) or 808 (FIG. 8) may be provided to the tank circuit 426. The coil 1 activation 902 may persist for a predetermined period of time $T_1$ (e.g., substantially 80 microseconds). Following expiration of the predetermined period of time $T_1$, the controller 716 may deactivate the control signals 416 for a delay period of time $T_2$ (e.g., substantially ten milliseconds)

before selecting and exciting transmit coil L2 (FIG. 4 and FIG. 5). During the delay period of time $T_2$ following the coil 1 activation 902, the coil switch S1 corresponding to transmit coil L1 remains closed to enable measurements to be taken from transmit coil L1.

The coil selection representation 900 also includes a coil 2 activation 904 during which transmit coil L2 of the transmit coils 410 (FIG. 4 and FIG. 5) is activated. During the coil 2 activation 904 a coil switch S2 (FIG. 4 and FIG. 5) of coil switches 404 corresponding to transmit coil L2 may be closed and the other coil switches S1, . . . , and SN of coil switches 404 may be opened responsive to coil select signals 418 from the controller 716. Also, during the coil 2 activation 904 the controller 716 may pulse the control signals 416 using pulse width modulation to generate the square wave signal 424 at output terminals of the H-bridge inverter 402 for a predetermined number Np of pulses. Responsive to the square wave signal 424, the power filter 740 may provide the sinusoidal signal 420 to the tank circuit 426. In examples where no power filter is used (e.g., FIG. 3, FIG. 6, and FIG. 8) the square wave signal 604 (FIG. 6) or 808 (FIG. 8) may be provided to the tank circuit 426. The coil 2 activation 904 may persist for a predetermined period of time, such as $T_1$. Following expiration of the predetermined period of time $T_1$, the controller 716 may deactivate the control signals 416 for a delay period of time $T_2$ before selecting and exciting transmit coil L3 (FIG. 4 and FIG. 5). During the delay period of time $T_2$ following the coil 2 activation 904, the coil switch S2 corresponding to transmit coil L2 remains closed to enable measurements to be taken from transmit coil L2.

The coil selection representation 900 includes a coil 3 activation 906 during which transmit coil L3 of the transmit coils 410 (FIG. 4 and FIG. 5) is activated. During the coil 3 activation 906 a coil switch S2 (FIG. 4 and FIG. 5) of coil switches 404 corresponding to a transmit coil L3 may be closed and the other coil switches S1, S2 of coil switches 404 may be opened responsive to coil select signals 418 from the controller 716. Also, during the coil 3 activation 906 the controller 716 may pulse the control signals 416 using pulse width modulation to generate the square wave signal 424 at output terminals of the H-bridge inverter 402 for a predetermined number Np of pulses. Responsive to the square wave signal 424, the power filter 740 may provide the sinusoidal signal 420 to the tank circuit 426. In examples where no power filter is used (e.g., FIG. 3, FIG. 6, and FIG. 8) the square wave signal 604 (FIG. 6) or 808 (FIG. 8) may be provided to the tank circuit 426. The coil 3 activation 906 may persist for a predetermined period of time $T_1$. Following expiration of the predetermined period of time $T_1$, the controller 716 may deactivate the control signals 416 for a delay period of time $T_2$. During the delay period of time $T_2$ following the coil 3 activation 906, the coil switch S3 corresponding to transmit coil L3 remains closed to enable measurements to be taken of transmit coil L3.

The delay period of time $T_2$ after each of the activations (e.g., coil 1 activation 902, coil 2 activation 904) may be used to collect data (e.g., samples of the measurement voltage potential 718 of FIG. 7) for computations and ensure that the tank circuit signal 722 (FIG. 7) has decayed to substantially zero. A longer delay $T_3$ (e.g., substantially 4 seconds) between a beginning of the coil 1 activation 902 and a beginning of the coil 1 activation 902 for a next cycle (corresponding to a next object detection operation) may be used. During inactive time from an end of the delay period of time $T_2$ following the coil 3 activation 906 to a beginning of the next coil 1 activation 902, the controller 716 may carry out computations and decisions, as will be discussed in more detail with reference to FIGS. 13, 14, 15, and 16.

Once the computations and decisions are complete the controller 716 may place the processing core 730 (FIG. 7) in sleep mode. In sleep mode most peripherals may be deactivated, with perhaps the exception of a watchdog timer. Once the watchdog time elapses at the end of the longer delay period of time $T_3$, the watchdog timer may wake the controller 716 and the controller 716 may start the cycle again with the coil 1 activation 902. As illustrated in FIG. 9, the coil selection representation 900 indicates that the transmitter 702 may be deactivated (e.g., in sleep mode) for a majority of the time, which may provide power savings.

Figure 10:
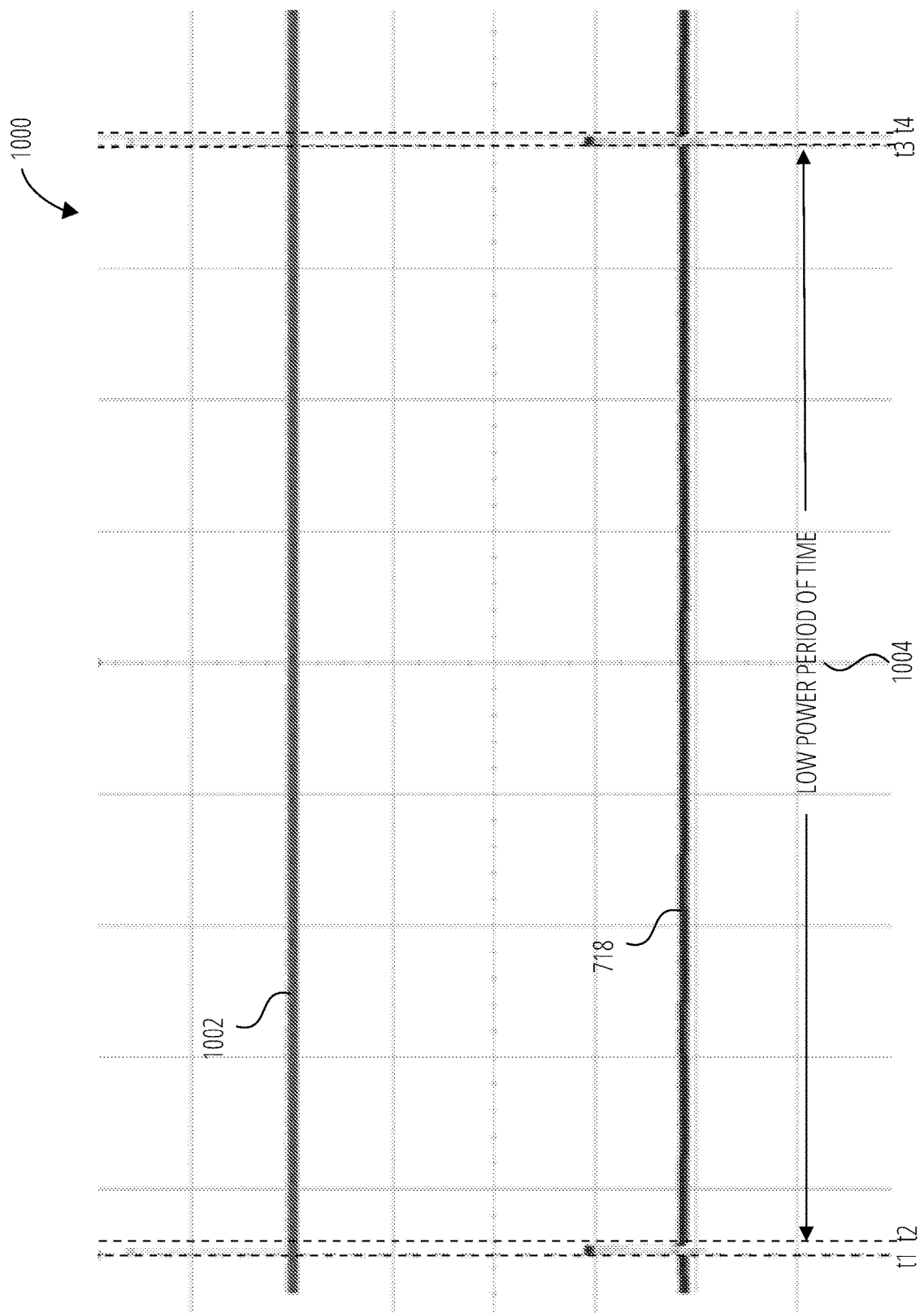
FIG. 10 is a plot illustrating example voltage potentials of a transmitter of the wireless power system illustrated in FIG. 7.
Figure 11:
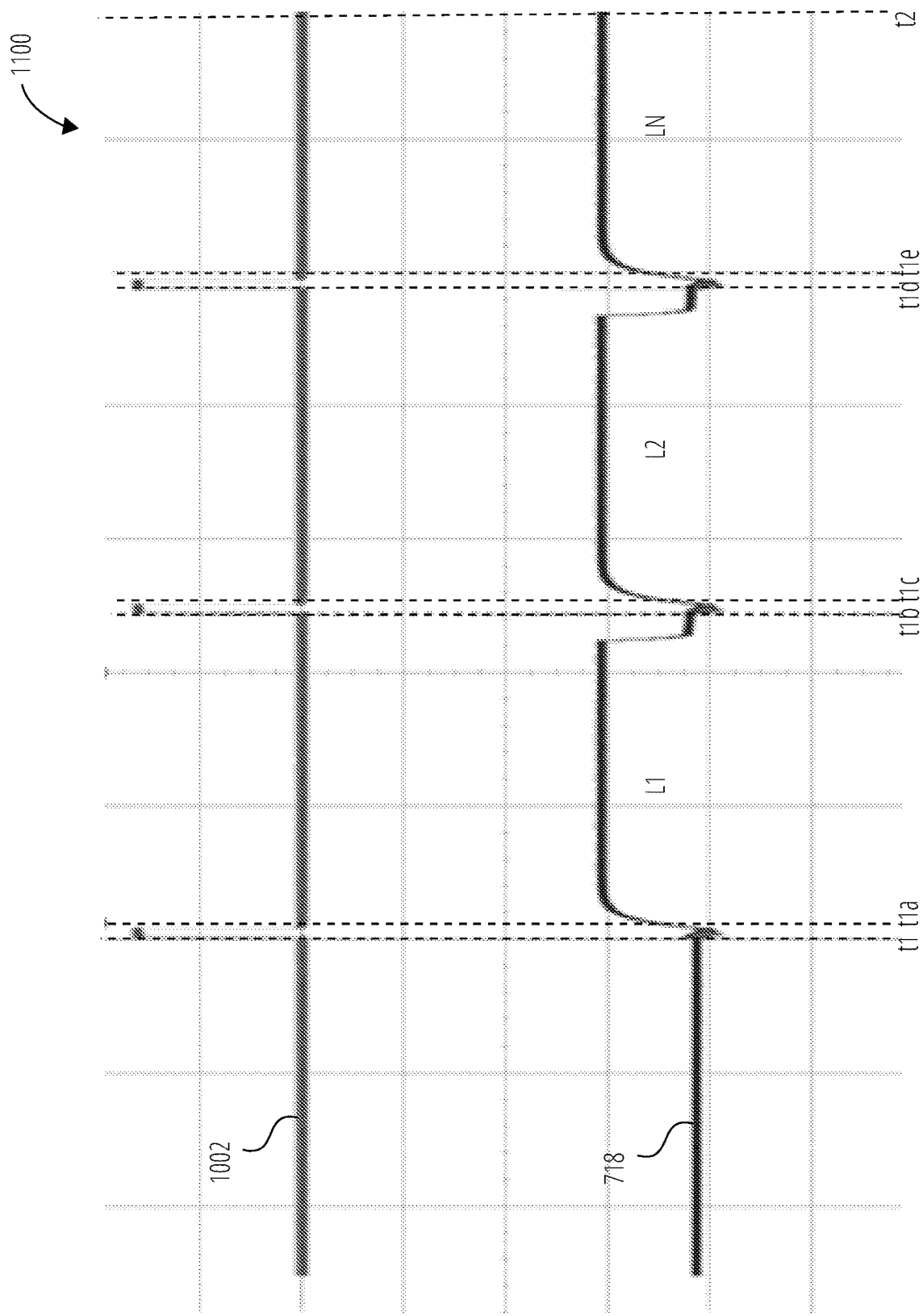
FIG. 11 is a plot illustrating example voltage potentials of the transmitter of the wireless power system illustrated in FIG. 7 during an object detection operation.

FIG. 10 is a plot 1000 illustrating example voltage potentials of the transmitter 702 of the wireless power system 700 illustrated in FIG. 7. The plot 1000 includes the measurement voltage potential 718 and a control signal 1002 of the control signals 416 of FIG. 4, FIG. 5, and FIG. 7 plotted against time (with the passage of time from earlier to later illustrated from left to right in FIG. 10). The control signal 1002 is one of the control signals 416 applied to one of the switches Sa, Sb, Sc, or Sd of FIG. 4 and FIG. 5. As a result, the control signal 1002 controls one of the switches Sa, Sb, Sc, or Sd to selectively operably couple the first node 408 or the second node 406 (FIG. 4 and FIG. 5) to the positive and negative terminals of the voltage source 412. The majority of the plot 1000 of FIG. 10 covers a low power period of time 1004. At times t1 and t3, however, the controller 716 (FIG. 7) may initiate an object detection operation. Assuming that a conductive foreign object or no object is detected, the object detecting operation may terminate at times t2 and t4, respectively, and operate in a low power mode (e.g., a sleep mode, a standby mode) between times t2 and t3. Accordingly, during a low power period of time 1004 between t2 and t3 the transmitter 702 may operate in a low power mode, conserving power between object detection operations. Since the majority of the plot 1000 covers low power operation time (e.g., low power period of time 1004), the only activity observable for the control signal 1002 and the measurement voltage potential 718 is between times t1 and t2, and between times t3 and t4. Accordingly, for the most part, the control signal 1002 and the measurement voltage potential 718 appear as straight, unchanging lines in the plot 1000 of FIG. 10. FIG. 11 and FIG. 12 illustrate activity of the control signal 1002 and the measurement voltage potential 718 between times t1 and t2 in more detail.

FIG. 11 is a plot 1100 illustrating example voltage potentials of the transmitter 702 of the wireless power system 700 illustrated in FIG. 7 during an object detection operation. The plot 1100 includes plots of the control signal 1002 and the measurement voltage potential 718. By way of non-limiting example, the plot 1100 may illustrate the behavior of the control signal 1002 and the measurement voltage potential 718 between time t1 and time t2, or between time t3 and time t4, of the plot 1000 of FIG. 10. FIG. 11 specifically indicates times t1 and t2, but it will be appreciated that from time t3 to time t4 of the plot 1000 of FIG. 10, control signal 1002 and measurement voltage potential 718 may be similar (e.g., depending on temperature and other operating parameters) to the control signal 1002 and measurement voltage potential 718 illustrated between times t1 and t2 of the plot 1000.

At time t1 the controller 716 selects transmit coil L1 of transmit coils 410 (FIG. 11 indicates L1 between t1 and t1*b* to show that transmit coil L1 is connected) and activates the control signal 1002 by alternating the control signal 1002 with others of the control signals 416 (FIG. 4, FIG. 5, and FIG. 7; the control signal 1002 is complementary to at least one other of the control signals 416) to generate a square wave (i.e., the square wave signal 424 of FIG. 4, FIG. 5, and FIG. 7). In response, the power filter 740 (FIG. 7) provides the sinusoidal signal 728 to the tank circuit 426 (FIG. 4, FIG. 5, and FIG. 7), and the tank circuit 426 charges up and the measurement voltage potential 718 begins to oscillate (the oscillations and alternation of the measurement voltage potential 718 are better seen between time t1 and time t1a1 of FIG. 12). After a predetermined number of pulses of the control signal 1002 the controller 716 stops alternating the control signal 1002, and the measurement voltage potential 718 starts to oscillate in a decaying manner, the oscillation according to a natural resonance frequency of the tank circuit 426 (these decaying oscillations are better seen between time t1a1 and time t1a of FIG. 12). The measurement voltage potential 718 is sampled, and the samples may be used to determine averages of amplitudes of peaks (e.g., positive and/or negative peaks) of the measurement voltage potential 718 having L1 connected in the tank circuit 426.

At time t1a, i.e., after a predetermined delay (e.g., $T_1$ of FIG. 9) from time t1, the controller 716 may de-assert the control signal 1002. FIG. 12 below illustrates the time period of the plot 1100 between t1 and t1a in more detail. It is noted that at time t1a one of switches Sa and Sc (FIG. 4, FIG. 5) is closed while the other switches are open, and the positive input voltage +Vin is applied to one of the first node 408 and the second node 406 (FIG. 4, FIG. 5), driving the measurement voltage potential 718 to start ramping up toward high. The measurement voltage potential 718 shown in FIG. 7 then remains high (although negligible current flows through transmit coil L1 so negligible power is expended or transmitted) until the one of switches Sa and Sc that is closed is opened a period of time before time t1b, electrically isolating the first node 408 and the second node 406 from the input voltage +Vin. As a result of the one of switches Sa and Sc being opened a period of time before time t1b, the measurement voltage potential 718 drops before time t1b. Alternatively, at time t1a one of the first node 408 or the second node 406 may be set to ground (e.g., zero volts), in which case the measurement voltage potential 718 will not rise and fall between time t1a and time t1b (not shown). This may be done to allow the tank circuit to discharge before time t1b.

At time t1b the controller 716 selects transmit coil L2 and repeats the operations discussed above for transmit coil L1 (between times t1 and t1a) for transmit coil L2 between times t1b and t1c. At time t1d the controller 716 selects transmit coil LN and repeats the operations discussed above for transmit coil LN (between times t1b and t1c) for transmit coil LN between times t1d and t1e. At time t2, the controller 716, now having performed the operations for each of the transmit coils 410 (FIG. 4, FIG. 5, and FIG. 7), may have samples of the measurement voltage potential 718 for each of the transmit coils 410 and thus may perform a data processing operation and an object sensing operation.

FIG. 12 is a plot 1200 illustrating example voltage potentials of the transmitter 702 of the wireless power system 700 illustrated in FIG. 7 during a data collection operation of the object detection operation. The plot 1200 includes plots of the control signal 1002 and the measurement voltage potential 718. By way of non-limiting example, the plot 1200 may illustrate the behavior of the control signal 1002 and the measurement voltage potential 718 between time t1 and time t1a, between time t1b and time t1c, or between time t1d and time t1e of the plot 1100 of FIG. 11. FIG. 12 specifically indicates times t1 and t1a, but it will be appreciated that from time t1b to time t1c and from time t1d to time t1e control signal 1002 and measurement voltage potential 718 may be similar (e.g., depending on temperature and other operating parameters) to the control signal 1002 and measurement voltage potential 718 illustrated between times t1 and t1a of the plot 1100.

As previously discussed, at time t1 the controller 716 (FIG. 7) selects transmit coil L1 (FIG. 4, FIG. 5) and enables the sinusoidal signal 728 (FIG. 7) by alternating the control signal 1002 with others of the control signals 416 (FIG. 4, FIG. 5, and FIG. 7) to generate the square wave signal 424 (FIG. 4, FIG. 5, and FIG. 7). FIG. 12 shows pulses 1202 of the control signal 1002. It will be noted that the pulses 1202 have a relatively small pulse width, which may cause the duty cycle of the corresponding square wave signal 424 to be relatively low (e.g., substantially 10% assuming that 7 volts of the sinusoidal signal 728 is applied to the transmit coil, without limitation), which may in turn result in a correspondingly low amount of power expenditure even while the sinusoidal signal 728 is enabled. In response to the sinusoidal signal 728, the tank circuit signal 722 charges up and the measurement voltage potential 718 begins to oscillate. It should be noted that the tank circuit 426 may require a relatively low average voltage potential of the sinusoidal signal 728 to charge the tank circuit 426 as compared to that of analog/digital ping methods. This average voltage potential may be achieved by using a very low voltage magnitude of the input voltage potential Vin (e.g., substantially 1.4 volts) of the voltage source 412 (FIG. 4, FIG. 5, and FIG. 7) with a relatively higher duty cycle (e.g., 50%) of the pulses 1202, a relatively higher magnitude of the input voltage potential Vin and a relatively lower duty cycle of the pulses 1202, or moderate input voltage potential Vin and moderate duty cycle of the pulses 1202.

After a predetermined number of pulses 1202 (e.g., about 15 pulses in FIG. 12) of the control signal 1002, at time t1a1, the controller 716 stops generating the control signal 1002, and the measurement voltage potential 718 starts to oscillate in a decaying manner, the oscillation according to a natural resonance frequency of the tank circuit 426. In examples where no power filter is present (e.g., FIG. 3, FIG. 6, and FIG. 8), during this oscillation the tank circuit 426 may be connected, throughout the oscillation (e.g., from time t1a1 to time t1a) to a negative or positive terminal of the DC power supply (e.g., voltage source 412 of FIG. 6, and FIG. 8) through the H-bridge inverter (e.g., switches Sb and Sd of the H-bridge inverter 402 of FIG. 4 and FIG. 5 may be closed to connect the tank circuit 426 to the negative terminal, or switches Sa and Sc of FIG. 6 may be closed to connect the tank circuit 426 to the positive terminal) to enable the tank circuit 426 to discharge. In the example illustrated in FIG. 4, where a power filter 422 is present, switch Sd may be closed to measure the measurement voltage potential 718 because the tank circuit 426 energy may discharge through the filter capacitor or capacitor (e.g., Cf of FIG. 4) by circulating a current. In the example illustrated in FIG. 5, all switches Sa, Sb, Sc, and Sd may be opened, and a differential version of the tank circuit signal 502 may be measured (e.g., using a differential amplifier rather than a simple resistor divider). During this discharge of the tank circuit 426, the measurement voltage potential 718 oscillates in a decaying manner. The measurement voltage potential 718 is sampled, and the samples may be used to determine the positive peaks 1204 and the negative peaks 1206 of the measurement voltage potential 718 with tank circuit 426 having L1 connected. An amplitude of a difference between an average of the positive peaks 1204 and an average of the negative peaks 1206 of the measurement voltage potential 718 may be determined by the controller 716.

In various examples an average peak to peak amplitude Pavg (e.g., a difference between the average of the positive peaks 1204 and the average of the negative peaks 1206) may be based off of measurements taken over a single measurement cycles. In various other examples the average value Pavg may be an average of average peak to peak amplitudes taken over multiple measurement cycles. Using an average of average peak to peak amplitudes may mask computational sensitivity to the computed values.

Figure 13:
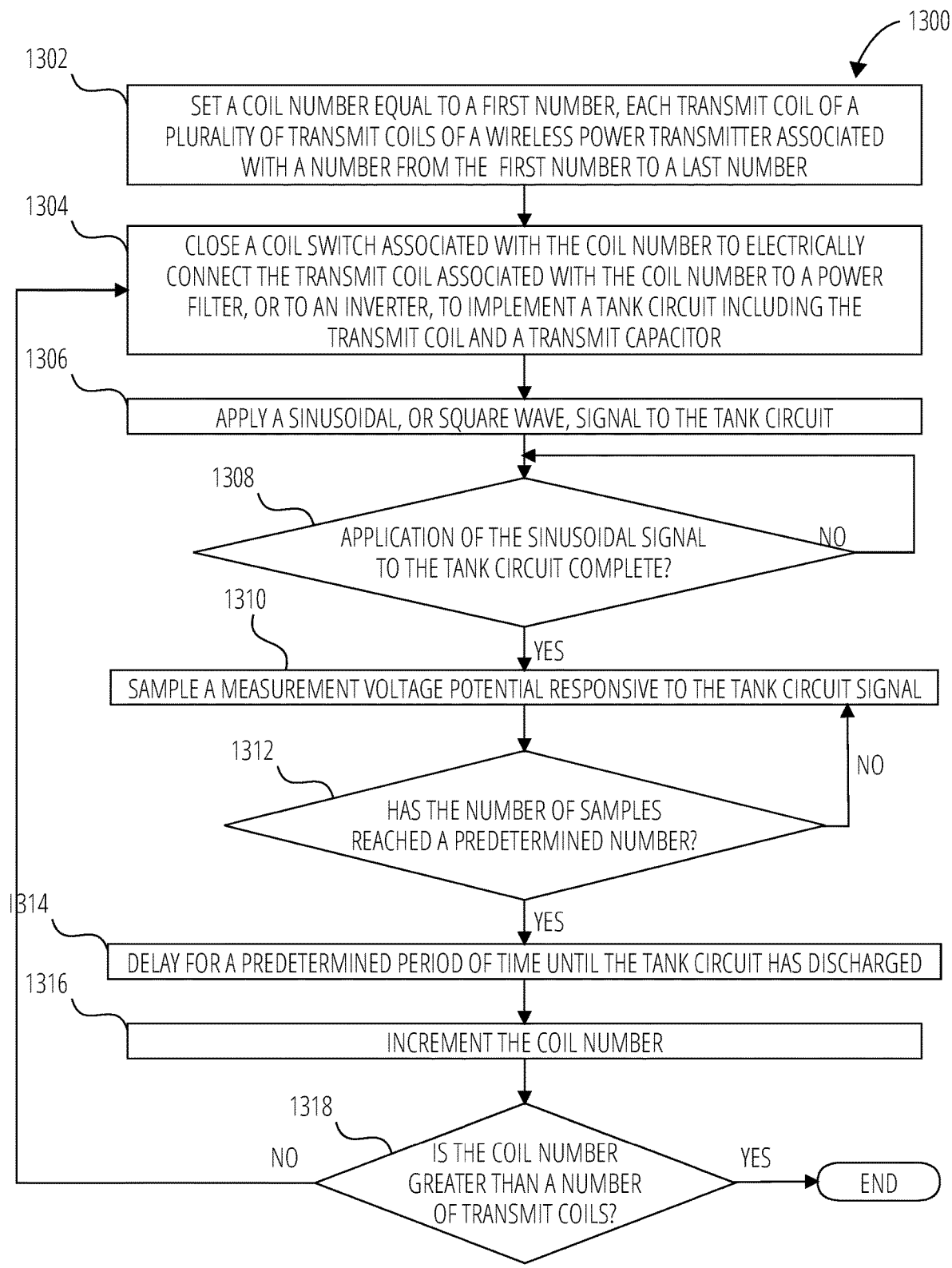
FIG. 13 is a flowchart illustrating a data collection method, according to various examples.

FIG. 13 is a flowchart illustrating a data collection method 1300, according to various examples. In various examples the data collection method 1300 may be performed by the controller 716 of FIG. 7. In various examples the data collection method 1300 may start after a predetermined number of PWM pulses of control signals (e.g., the control signals 416 of FIG. 4, FIG. 5, and FIG. 7) are provided to an H-bridge inverter (e.g., the H-bridge 204 of FIG. 2, the H-bridge inverter 402 of FIG. 4, FIG. 5, and FIG. 7) with one of the transmit coils (e.g., transmit coils 108 of FIG. 1 and FIG. 2, the transmit coils 410 of FIG. 4, FIG. 5, and FIG. 7) implemented into the tank circuit (e.g., the resonant tank circuit 210 of FIG. 2, the tank circuit 426 of FIG. 4, FIG. 5, and FIG. 7) by a respective coil switch. At operation 1302 the data collection method 1300 includes setting a coil number equal to a first number. Each transmit coil of a plurality of transmit coils of a wireless power transmitter is associated with a number from the first number to a last number. In various examples, operation 1302, setting the coil number equal to the first number, may include setting the coil number to 1 (e.g., transmit coil L1 of FIG. 4 and FIG. 5, having a coil number=1). In various examples, operation 1302, setting the coil number equal to the first number, may include setting other coil numbers to respective other numbers (e.g., transmit coil L2 corresponding to coil number=2, transmit coil LN corresponding to coil number=N).

At operation 1304 the data collection method 1300 includes closing a coil switch associated with the coil number to electrically connect the transmit coil associated with the coil number to a power filter, or to an inverter, to implement a tank circuit including the transmit coil and a transmit capacitor. At operation 1306 the data collection method 1300 includes applying a sinusoidal, or square wave, signal to the tank circuit. At decision 1308 the data collection method 1300 includes determining whether the application of the sinusoidal signal to the tank circuit (operation 1306) is complete. In various examples determining whether the application of the sinusoidal signal to the tank circuit is complete includes determining whether a predetermined number of cycles Np of the control signals is completed. If it is determined that the application of the sinusoidal signal to the tank circuit is not complete, the data collection method 1300 may include returning to decision 1308.

If, however, it is determined at decision 1308 that the application of the sinusoidal signal to the tank circuit is complete, at operation 1310 the data collection method 1300 includes sampling a measurement voltage potential responsive to a tank circuit signal. In various examples sampling the measurement voltage potential may include sampling the measurement voltage potential at a very high rate (e.g., 1.6 megahertz), which may ensure that there are several samples available for each cycle, when the resonant frequency is about 78 kilohertz (e.g., 78 kilohertz may be a resonant frequency of certain transmitters such as an MP-A9 transmitter). With a 1.6 megahertz sample rate, twenty samples may be available every cycle. At decision 1312 the data collection method 1300 includes determining whether the number of samples has reached a predetermined number. By way of non-limiting example, the predetermined number of samples may be substantially 500 samples, which corresponds to substantially twenty cycles of the measurement voltage potential captured for post-processing (e.g., in data processing method 1400 of FIG. 14). If it is determined that the number of samples has not reached the predetermined number, the data collection method 1300 includes returning to operation 1310, sampling the measurement voltage potential responsive to the tank circuit signal.

If however, it is determined at decision 1312 that the number of samples has reached the predetermined number, at operation 1314 the data collection method 1300 includes delaying for a predetermined period of time until the tank circuit has discharged. The samples for each coil may be processed (e.g., according to the data processing method 1400 of FIG. 14) immediately after the samples are collected in place of during the delay, or may be processed together with samples from other coils.

At operation 1316 the data collection method 1300 includes incrementing the coil number. At decision 1318 the data collection method 1300 includes determining whether the coil number is greater than a number of the transmit coils. If it is determined that the coil number is not greater than the number of the transmit coils, the data collection method 1300 may return to operation 1304, closing the coils switch associated with the coil number to electrically connect the transmit coil associated with the coil number to the power filter, or the inverter, to implement the tank circuit including the transmit coil and the transmit capacitor. If, however, it is determined at decision 1318 that the coil number is greater than the number of transmit coils, the data collection method 1300 may end.

Figure 14:
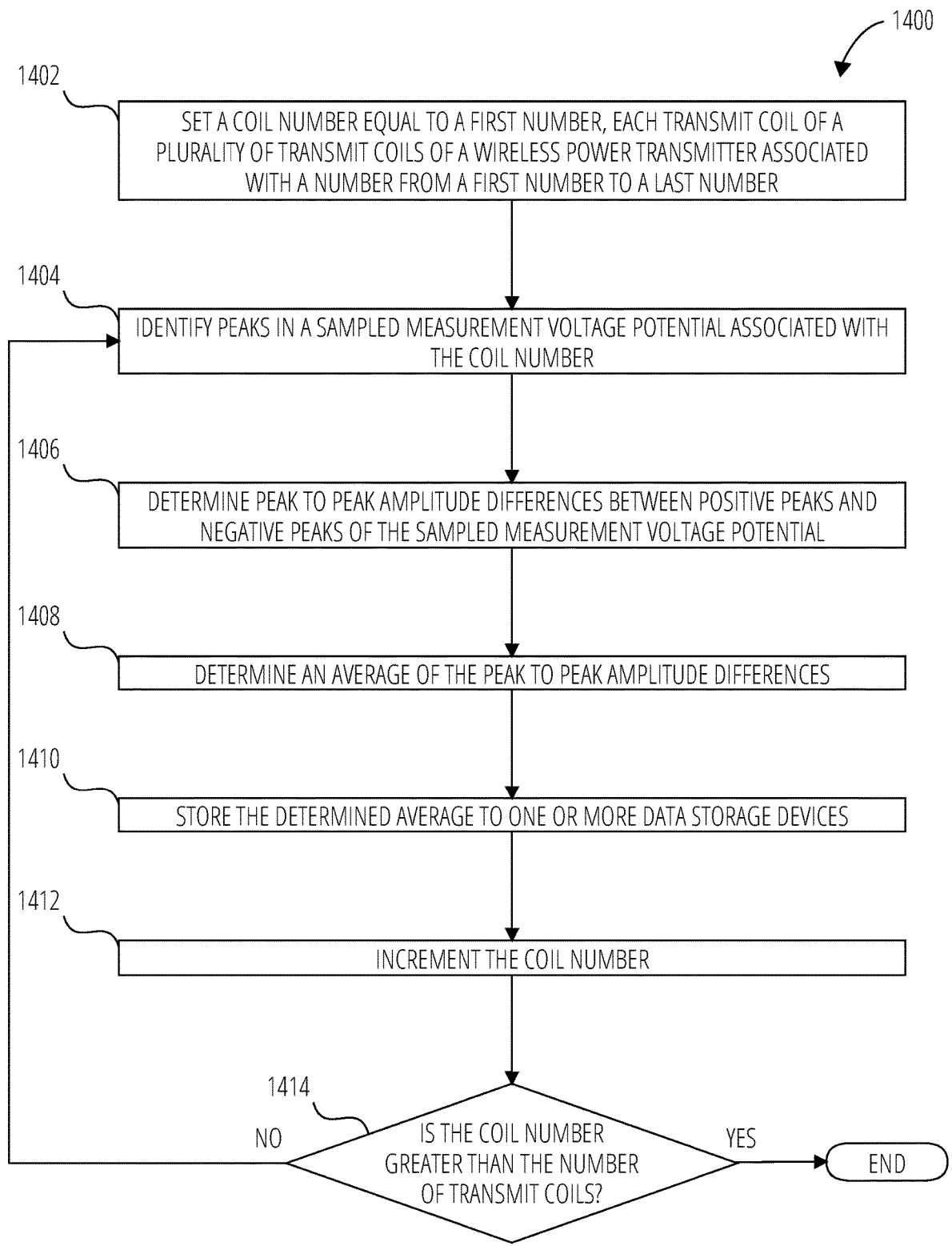
FIG. 14 is a flowchart illustrating a data processing method, according to various examples.

FIG. 14 is a flowchart illustrating a data processing method 1400, according to various examples. FIG. 14 may explain a computational portion of an object detection operation. The data processing method 1400 may be performed by the controller 716, without limitation. The data processing method 1400 may be performed on samples collected for a measurement voltage potential (e.g., the measurement voltage potential 718 of FIG. 7) such as by using the data collection method 1300 of FIG. 13. Samples of the measurement voltage potential for each of the transmit coils may be available for processing. At operation 1402 the data processing method 1400 includes setting a coil number equal to a first number. Each transmit coil of a plurality of transmit coils of a wireless power transmitter is associated with a number from a first number to a last number.

At operation 1404 the data processing method 1400 includes identifying "k" peaks in a sampled measurement voltage potential associated with the coil number. As previously discussed, the measurement voltage potential may include a decaying sinusoid with a resonant frequency fr. Peak values (e.g., negative and positive peak values) may be identified. Peak values may be identified by comparing a sample value to a previous sample value and a next sample value in a three-point filter arrangement. At a positive peak $Pp_k$ the previous sample value and the next sample value are lower than the present value. At a negative peak $Pn_k$ the previous sample value and the next sample value are higher than the present value. The positive and negative peaks may be identified and stored (e.g., in an array) to a data storage device (e.g., the storage 732 of FIG. 7).

At operation 1406 the data processing method 1400 includes determining peak to peak amplitude differences $P_k$ between positive peaks $Pp_k$ and negative peaks $Pn_k$ of the sampled measurement voltage potential. The peak to peak amplitude differences of respective peaks, $P_k$, may be determined as $P_k=Pp_k-Pn_k$. At operation 1408 the data processing method 1400 includes determining an average of the peak to peak amplitude differences. The average Pavg of the peak to peak amplitude differences $P_k$ may be determined to be Pavg=$\Sigma P_k$/N, or equivalently Pavg=$\Sigma Pp_k-\Sigma Pn_k$/N where k=1, 2, ..., N, and N is the number of positive or negative peak values. The average Pavg may be based off of a single computation (Pavg=$\Sigma P_k$/N), or may be computed over several cycles (e.g., Pavg may be the average of averages of multiple data collection cycles). The average of averages may mask the computational sensitivity to the computed values. At operation 1410 the data processing method 1400 includes storing the determined average to one or more data storage devices (e.g., the storage 732 of FIG. 7).

At operation 1412 the data processing method 1400 includes incrementing the coil number. At decision 1414 the data processing method 1400 includes determining whether the coil number is greater than a number of the transmit coils. If it is determined that the coil number is not greater than the number of transmit coils, the data processing method 1400 returns to operation 1404, identifying peaks in the sampled measurement voltage potential associated with the coil number. If, however, it is determined at decision 1414 that the coil number is greater than the number of transmit coils.

Figure 15:
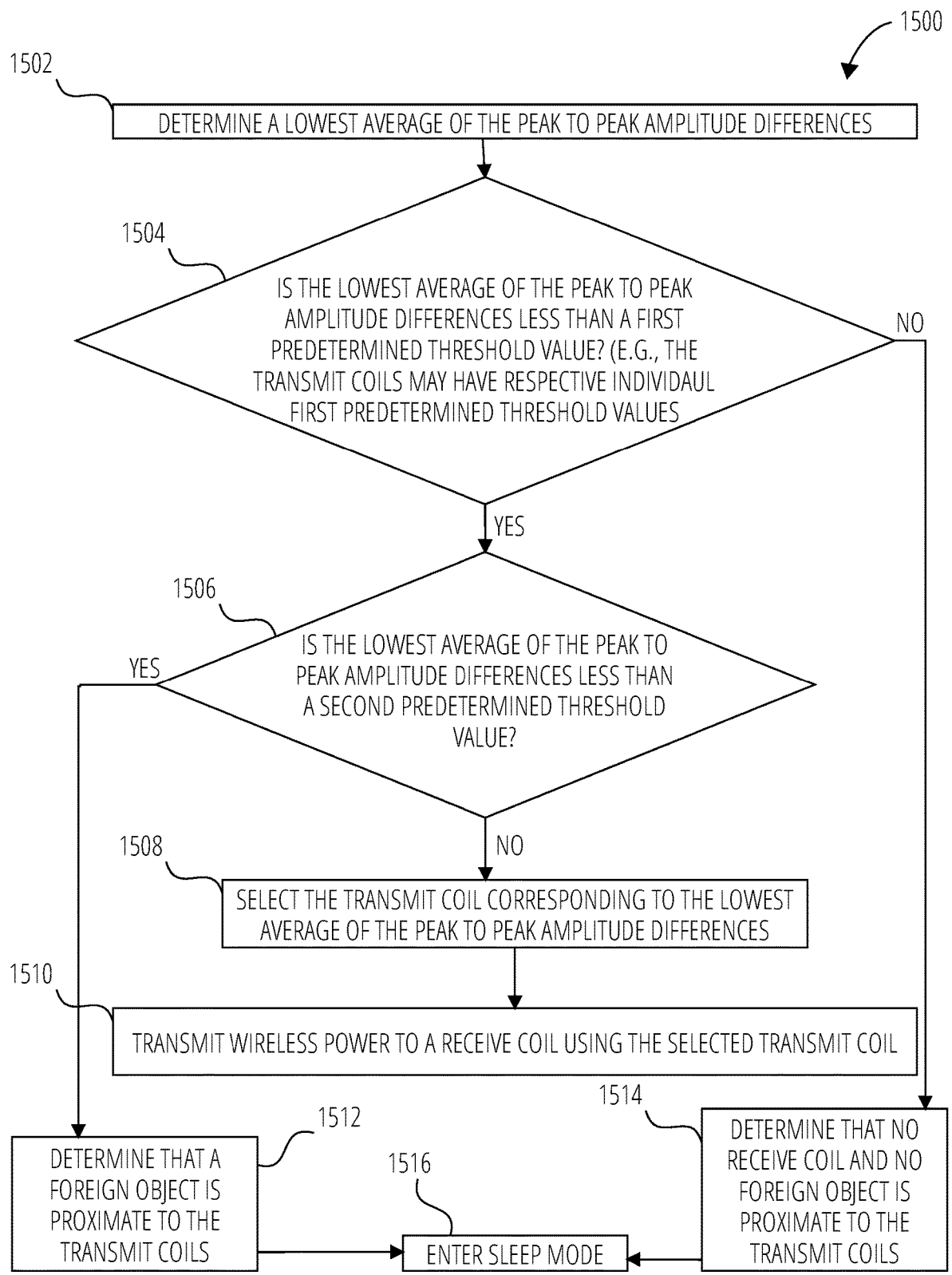
FIG. 15 is a flowchart illustrating an object detection method, according to various examples.

FIG. 15 is a flowchart illustrating an object detection method 1500, according to various examples. The object detection method 1500 may use the averages of the peak to peak amplitude differences such as those (Pavg) determined using the data processing method 1400 of FIG. 14. In various examples the object detection method 1500 may be performed by the controller 716 of FIG. 7. At operation 1502 the object detection method 1500 includes determining a lowest average of the peak to peak amplitude differences. A transmit coil corresponding to the lowest average of the peak to peak amplitude differences may have the highest potential to be coupled with an external object (e.g., a receive coil 714 of FIG. 7, a foreign object).

At decision 1504 the object detection method 1500 includes determining whether the lowest average of the peak to peak amplitude differences is less than a first predetermined threshold value (e.g., the transmit coils may have respective individual first predetermined threshold values). By way of non-limiting example, a first predetermined threshold value associated with a first one of the plurality of transmit coils is different from a first predetermined threshold value associated with a second one of the plurality of transmit coils. The first predetermined value may be a minimum value of the lowest average of the peak to peak amplitude differences that is likely to correspond to the presence of a receive coil or a foreign object in proximity to the transmit coils. As a specific, non-limiting example, in an MPA-13 tricoil charger an average of the peak to peak amplitude differences may be expected to be substantially between 1400-1500 counts (e.g., "counts" in this context refer to an output of an ADC used to sample the measurement voltage potential, in which, for example, a 12 bit 3.3 volt referenced ADC may output 1241 counts when one volt is connected at its input (1*($2^{12}-1$)/3.3)). As a result, the first predetermined threshold value may be set at less than 1200. A value for the first predetermined threshold value may be determined as discussed with reference to the calibration method 1600 of FIG. 16. Each transmit coil may have its own first predetermined threshold value associated therewith. Also, the first predetermined threshold value of one of the transmit coils may be the same as, or different from, the first predetermined threshold value of another of the transmit coils. If it is determined that the lowest average of the peak to peak amplitude differences is not less than the first predetermined threshold value, the object detection method 1500 includes determining that no receive coil and no foreign object is proximate to the transmit coils at operation 1514 and entering a sleep mode at operation 1516.

If, however, it is determined at decision 1504 that the lowest average of the peak to peak amplitude differences is less than the first predetermined threshold value, at decision 1506 the object detection method 1500 includes determining whether the lowest average of the peak to peak amplitude differences is less than a second predetermined threshold value. The second predetermined threshold value is less than the first predetermined threshold value. By way of non-limiting example, the second predetermined value may be substantially between 350 and 400. If it is determined that the lowest average of the peak to peak amplitude differences is less than the second predetermined threshold value, the object detection method 1500 includes determining that a foreign object is proximate to the transmit coils at operation 1512, and entering the sleep mode at operation 1516.

If, however, it is determined that the lowest average of the peak to peak amplitude differences is not less than the second predetermined threshold value, the object detection method 1500 includes selecting the transmit coil corresponding to the lowest average of the peak to peak amplitude differences at operation 1508, and transmitting wireless power to a receive coil using the selected transmit coil at operation 1510.

Figure 16:
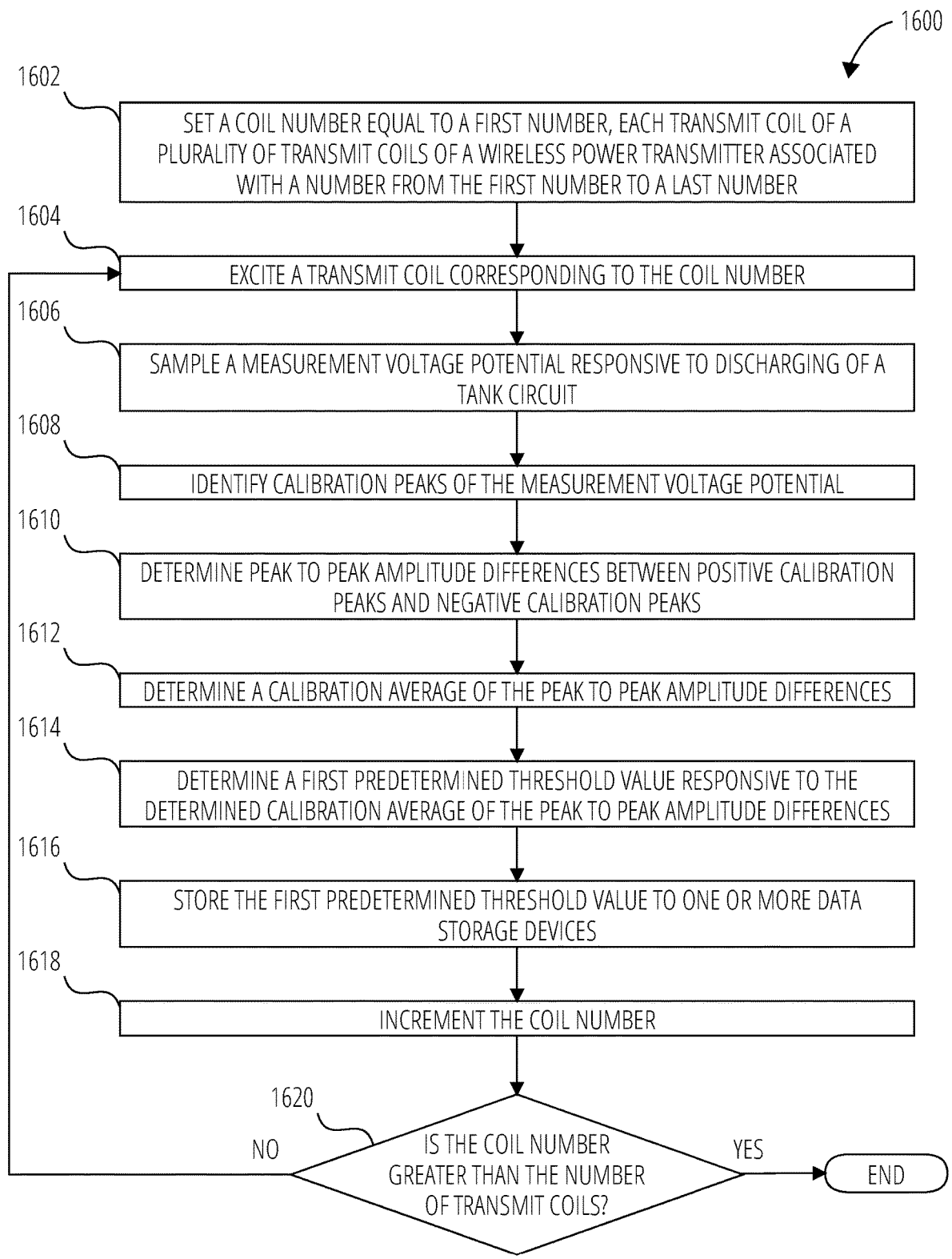
FIG. 16 is a flowchart illustrating a calibration method, according to various examples.

FIG. 16 is a flowchart illustrating a calibration method 1600, according to various examples. Inductance and capacitance values for components of the tank circuit may have individual tolerances of substantially 10% to 20%, and a combined tolerance of 20% to 40% for the overall tank circuit. Due to this potential wide variation in inductance and capacitance values, it may be difficult to select a reliable value of the first predetermined threshold value used at decision 1504 of the object detection method 1500 of FIG. 15 for an entire lot of manufactured wireless power transmitters (e.g., the transmitter 702 of FIG. 7). Also, a center transmit coil and outer transmit coils may have different inductance values by design. As a result, calibration for each individual transmit coil, such as the calibration method 1600 of FIG. 16, may enable an appropriate value of the first predetermined threshold value to be selected for each of the transmit coils. The calibration method 1600 may be performed under controlled circumstances, ensuring that there are no objects (e.g., receive coils, foreign objects) in proximity to the transmit coils. The calibration method 1600 may be performed once for a lifetime of a wireless power transmitter.

At operation 1602 the calibration method 1600 includes setting a coil number equal to a first number. Each transmit coil of a plurality of transmit coils of a wireless power transmitter is associated with a number from the first number to a last number. At operation 1604 the calibration method 1600 includes exciting a transmit coil corresponding to the coil number. At operation 1606 the calibration method 1600 includes sampling a measurement voltage potential responsive to discharging of a tank circuit.

At operation 1608 the calibration method 1600 includes identifying calibration peaks of the measurement voltage potential. At operation 1610 the calibration method 1600 includes determining peak to peak amplitude differences between positive calibration peaks and negative calibration peaks. At operation 1612 the calibration method 1600 includes determining a calibration average of the peak to peak amplitude differences. In various examples determining the average of the peak to peak amplitude differences for a transmit coil may include calculating an average of averages of the peak to peak amplitude differences for multiple measurement cycles of the transmit coil.

At operation 1614 the calibration method 1600 includes determining a first predetermined threshold value responsive to the determined calibration average of the peak to peak amplitude differences. By way of non-limiting example, the first predetermined threshold value may be determined to be the product between a multiplier T and the determined average of the peak to peak amplitude differences as determined at operation 1612. Also by way of non-limiting example, the multiplier T may have a value of between 0.8 and 0.9 (80% to 90%). At operation 1616 the calibration method 1600 includes storing the first predetermined threshold value to one or more data storage devices (e.g., the storage 732 of FIG. 7).

At operation 1618 the calibration method 1600 includes incrementing the coil number. At decision 1620 the calibration method 1600 includes determining whether the coil number is greater than a number of the transmit coils. If it is determined that the coil number is not greater than the number of transmit coils, the calibration method 1600 may return to operation 1604, exciting the transmit coil corresponding to the coil number. If, however, it is determined that the coil number is greater than the number of transmit coils at decision 1620, the calibration method 1600 may end.

Figure 17:
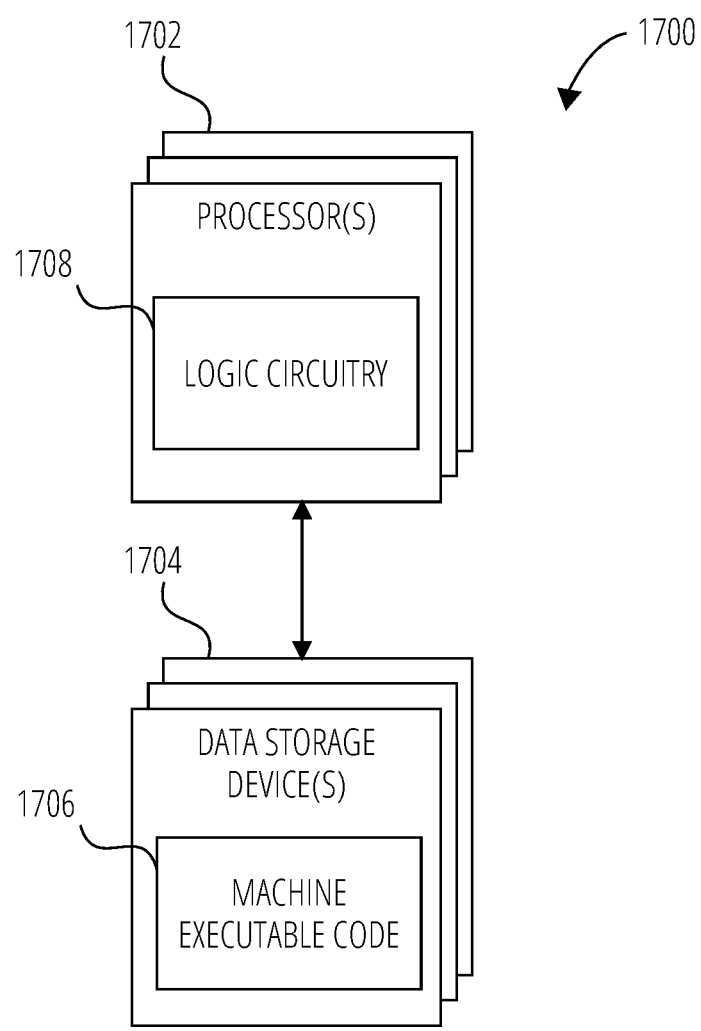
FIG. 17 is a block diagram of circuitry that, in some examples, may be used to implement various functions, operations, acts, processes, and/or methods disclosed herein.

It will be appreciated by those of ordinary skill in the art that functional elements of examples disclosed herein (e.g., functions, operations, acts, processes, and/or methods) may be implemented in any suitable hardware, software, firmware, or combinations thereof. FIG. 17 illustrates non-limiting examples of implementations of functional elements disclosed herein. In some examples, some or all portions of the functional elements disclosed herein may be performed by hardware specially implemented for carrying out the functional elements.

FIG. 17 is a block diagram of circuitry 1700 that, in some examples, may be used to implement various functions, operations, acts, processes, and/or methods disclosed herein. The circuitry 1700 includes one or more processors 1702 (sometimes referred to herein as "processors 1702") operably coupled to one or more data storage devices (sometimes referred to herein as "storage 1704"). The storage 1704 includes machine executable code 1706 stored thereon and the processors 1702 include logic circuitry 1708. The machine executable code 1706 includes information describing functional elements that may be implemented by (e.g., performed by) the logic circuitry 1708. The logic circuitry 1708 is adapted to implement (e.g., perform) the functional elements described by the machine executable code 1706. The circuitry 1700, when executing the functional elements described by the machine executable code 1706, should be considered as special purpose hardware implemented for carrying out functional elements disclosed herein. In some examples the processors 1702 may perform the functional elements described by the machine executable code 1706 sequentially, concurrently (e.g., on one or more different hardware platforms), or in one or more parallel process streams.

When implemented by logic circuitry 1708 of the processors 1702, the machine executable code 1706 adapts the processors 1702 to perform operations of examples disclosed herein. For example, the machine executable code 1706 may adapt the processors 1702 to perform at least a portion or a totality of the data collection method 1300 of FIG. 13, the data processing method 1400 of FIG. 14, the object detection method 1500 of FIG. 15, and/or the calibration method 1600 of FIG. 16. As another example, the machine executable code 1706 may adapt the processors 1702 to perform at least a portion or a totality of the operations discussed for the controller 716 of FIG. 7. As a specific, non-limiting example, the machine executable code 1706 may adapt the processors 1702 to periodically excite transmit coils, sample a measurement voltage potential that is proportional to a tank circuit signal, and determine whether a receive coil, a foreign object, or nothing is proximate to the transmit coils.

The processors 1702 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes functional elements corresponding to the machine executable code 1706 (e.g., software code, firmware code, hardware descriptions) related to examples of the present disclosure. It is noted that a general-purpose processor (may also be referred to herein as a host processor or simply a host) may be a microprocessor, but in the alternative, the processors 1702 may include any conventional processor, controller, microcontroller, or state machine. The processors 1702 may also be implemented as a combination of computing devices, such as a combination of a DSP and a microprocessor, a plurality of microprocessors, one or more microprocessors in conjunction with a DSP core, or any other such configuration.

In some examples the storage 1704 includes volatile data storage (e.g., random-access memory (RAM)), non-volatile data storage (e.g., Flash memory, a hard disc drive, a solid state drive, erasable programmable read-only memory (EPROM), etc.). In some examples the processors 1702 and the storage 1704 may be implemented into a single device (e.g., a semiconductor device product, a system on chip (SOC), etc.). In some examples the processors 1702 and the storage 1704 may be implemented into separate devices.

In some examples the machine executable code 1706 may include computer-readable instructions (e.g., software code, firmware code). By way of non-limiting example, the computer-readable instructions may be stored by the storage 1704, accessed directly by the processors 1702, and executed by the processors 1702 using at least the logic circuitry 1708. Also by way of non-limiting example, the computer-readable instructions may be stored on the storage 1704, transferred to a memory device (not shown) for execution, and executed by the processors 1702 using at least the logic circuitry 1708. Accordingly, in some examples the logic circuitry 1708 includes electrically configurable logic circuitry 1708.

In some examples the machine executable code 1706 may describe hardware (e.g., circuitry) to be implemented in the logic circuitry 1708 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, System-Verilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 1708 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine executable code 1706 may include an HDL, an RTL, a GL description, a mask level description, other hardware description, or any combination thereof.

In examples where the machine executable code 1706 includes a hardware description (at any level of abstraction), a system (not shown, but including the storage 1704) may implement the hardware description described by the machine executable code 1706. By way of non-limiting example, the processors 1702 may include a programmable logic device (e.g., an FPGA or a PLC) and the logic circuitry 1708 may be electrically controlled to implement circuitry corresponding to the hardware description into the logic circuitry 1708. Also by way of non-limiting example, the logic circuitry 1708 may include hard-wired logic manufactured by a manufacturing system (not shown, but including the storage 1704) according to the hardware description of the machine executable code 1706.

Regardless of whether the machine executable code 1706 includes computer-readable instructions or a hardware description, the logic circuitry 1708 is adapted to perform the functional elements described by the machine executable code 1706 when implementing the functional elements of the machine executable code 1706. It is noted that although a hardware description may not directly describe functional elements, a hardware description indirectly describes functional elements that the hardware elements described by the hardware description are capable of performing.

EXAMPLES

A non-exhaustive, non-limiting list of example embodiments follows. Not each of the example embodiments listed below are explicitly and individually indicated as being combinable with all others of the example embodiments listed below and embodiments discussed above. It is intended, however, that these example embodiments are combinable with all other example embodiments and embodiments discussed above unless it would be apparent to one of ordinary skill in the art that the embodiments are not combinable.

Example 1: An apparatus, comprising: a measurement voltage potential input terminal to receive a measurement voltage potential responsive to a tank circuit signal at a tank circuit, the tank circuit selectively including a respective one of a plurality of transmit coils; and a processing core to: determine a respective average of peak to peak amplitude differences present in sampled measurement voltage potentials for the respective plurality of transmit coils; determine a lowest of the respective averages of the peak to peak amplitude differences; and select a transmit coil corresponding to the lowest average of the peak to peak amplitude differences from the plurality of transmit coils to transmit wireless power to a receive coil of a wireless power receiver responsive to a determination that the lowest average of the peak to peak amplitude differences is between a first predetermined threshold value and a second predetermined threshold value.

Example 2: The apparatus of Example 1, wherein the controller is to determine that no receive coil and no foreign object are proximate to the plurality of transmit coils responsive to a determination that the lowest average of the peak to peak amplitude differences is not less than the first predetermined threshold value.

Example 3: The apparatus of Example 1, wherein the controller is to determine that a foreign object is proximate to the plurality of transmit coils responsive to a determination that the lowest average of the peak to peak amplitude differences is less than the second predetermined threshold value.

Example 4: The apparatus according to any one of Examples 1-3, wherein transmit coils of the plurality of transmit coils have respective individual first predetermined threshold values.

Example 5: The apparatus according to any one of Examples 1-4, wherein a first predetermined threshold value associated with a first one of the plurality of transmit coils is different from a first predetermined threshold value associated with a second one of the plurality of transmit coils.

Example 6: The apparatus according to any one of Examples 1-5, wherein the processing core is to determine the first predetermined threshold value for each of the plurality of transmit coils using a calibration operation.

Example 7: The apparatus of Example 6, wherein the processing core is to perform the calibration operation by, for each of the plurality of transmit coils with no receive coil and no foreign objects in proximity to the plurality of transmit coils: sample the measurement voltage potential responsive to discharging of the tank circuit, identify calibration peaks of the measurement voltage potential, determine calibration peak to peak amplitude differences between positive calibration peaks and negative calibration peaks; determine a calibration average of the calibration peak to peak amplitude differences; and determine the first predetermined threshold value responsive to the determined calibration average.

Example 8: An apparatus, comprising: a tank circuit comprising a transmit capacitor and selectively comprising a respective one of a plurality of transmit coils connected to the transmit capacitor; and a controller to select one of the plurality of transmit coils to use to transmit wireless power responsive to average differences between positive peaks and negative peaks of a measurement voltage potential for each of the plurality of transmit coils, the measurement voltage potential proportional to a tank circuit voltage potential, or a tank circuit current, of the tank circuit responsive to discharge of the tank circuit.

Example 9: The apparatus of Example 8, wherein the controller is to select the one of the plurality of transmit coils that corresponds to a lowest of the average amplitude differences between the positive peaks and the negative peaks.

Example 10: The apparatus according to any one of Examples 8 and 9, comprising a power filter to receive a square wave signal and provide a sinusoidal signal to the plurality of transmit coils and the transmit capacitor responsive to the square wave signal.

Example 11: The apparatus of Example 10, wherein the power filter comprises a second order inductive and capacitive power filter.

Example 12: The apparatus of Example 10, wherein the power filter comprises a filter capacitor electrically connected from a first filter inductor to a second filter inductor.

Example 13: The apparatus of Example 12, wherein the power filter comprises another filter capacitor electrically connected to the second filter inductor and the filter capacitor.

Example 14: The apparatus according to any one of Examples 8-13, wherein the controller is to determine that no receive coil and no foreign object is proximate to the plurality of transmit coils responsive to a lowest of the average amplitude differences between the positive peaks and the negative peaks being not less than a first predetermined threshold value.

Example 15: The apparatus according to any one of Examples 8-14, wherein the controller is to determine that a foreign object is proximate to the plurality of transmit coils responsive to a lowest of the average of the amplitude differences between the positive peaks and the negative peaks being less than a second predetermined threshold value.

Example 16: The apparatus according to any one of Examples 8-15, wherein the controller is to enter a sleep mode responsive to a determination that a foreign object is proximate to the plurality of transmit coils or to a determination that no foreign object and no receive coil is proximate to the plurality of transmit coils.

Example 17: A method of detecting an object, the method comprising: determining a lowest average of peak to peak amplitude differences corresponding to a plurality of transmit coils; determining that nothing is proximate to the plurality of transmit coils responsive to a determination that the lowest average of peak to peak amplitude differences is not less than a first predetermined threshold value; determining that a foreign object is proximate to the plurality of transmit coils responsive to a determination that the lowest average of peak to peak amplitude differences is less than the first predetermined threshold value and less than a second predetermined threshold value; and selecting a transmit coil corresponding to the lowest average of peak to peak amplitude differences to transmit wireless power responsive to a determination that the lowest average of the peak to peak amplitude differences is less than the first predetermined threshold value and not less than the second predetermined threshold value.

Example 18: The method of Example 17, comprising: setting a coil number equal to a first number, respective transmit coils of the plurality of transmit coils associated with a respective number from a first number to a last number; closing a coil switch associated with the coil number to electrically connect the respective transmit coil associated with the coil number to implement a tank circuit including the transmit coil and a transmit capacitor; applying a sinusoidal or square wave signal to the tank circuit; sampling a measurement voltage potential responsive to a tank circuit signal during discharge of the tank circuit after application of the sinusoidal signal to the tank circuit is complete; incrementing the coil number; and returning to closing the coil switch associated with the coil number responsive to a determination that the coil number is not greater than a number of the plurality of transmit coils.

Example 19: The method of Example 18, comprising: setting the coil number equal to the first number; identifying peaks in a sampled measurement voltage potential associated with the coil number; determining peak to peak amplitude differences between positive peaks and negative peaks; determining an average of the peak to peak amplitude differences; storing a determined average to one or more data storage devices; incrementing the coil number; and returning to identify the peaks in the sampled measurement voltage potential responsive to a determination that the coil number is not greater than a number of the plurality of transmit coils.

Example 20: The method according to any one of Examples 17-19, comprising: setting a coil number equal to a first number, each transmit coil of the plurality of transmit coils associated with a number from a first number to a last number; exciting a transmit coil corresponding to the coil number; sampling a measurement voltage potential responsive to a tank circuit signal during discharge of the tank circuit after excitation of the transmit coil is completed; identifying peaks of the measurement voltage potential; determining peak to peak amplitude differences between positive peaks and negative peaks of the measurement voltage potential; determining an average of the peak to peak amplitude differences; determining the first predetermined threshold value responsive to the determined average of the peak to peak amplitude differences; incrementing the coil number; and returning to excite the transmit coil corresponding to the coil number responsive to a determination that the coil number is not greater than a number of the plurality of transmit coils.

CONCLUSION

As used in the present disclosure, the terms "module" or "component" may refer to specific hardware implementations to perform the actions of the module or component and/or software objects or software routines that may be stored on and/or executed by general purpose hardware (e.g., computer-readable media, processing devices, etc.) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Also, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventors.

What is claimed is:

1. An apparatus, comprising:
  a measurement voltage potential input terminal to receive a measurement voltage potential responsive to a tank circuit signal at a tank circuit, the tank circuit selectively including a respective one of a plurality of transmit coils; and
  a processing core to:
  determine a respective average of peak to peak amplitude differences present in sampled measurement voltage potentials for the respective plurality of transmit coils;
  determine a lowest of the respective averages of the peak to peak amplitude differences; and
  select a transmit coil corresponding to the lowest average of the peak to peak amplitude differences from the plurality of transmit coils to transmit wireless power to a receive coil of a wireless power receiver responsive to a determination that the lowest average of the peak to peak amplitude differences is between a first predetermined threshold value and a second predetermined threshold value.

2. The apparatus of claim 1, wherein a controller is to determine that no receive coil and no foreign object are proximate to the plurality of transmit coils responsive to a determination that the lowest average of the peak to peak amplitude differences is not less than the first predetermined threshold value.

3. The apparatus of claim 1, wherein a controller is to determine that a foreign object is proximate to the plurality of transmit coils responsive to a determination that the lowest average of the peak to peak amplitude differences is less than the second predetermined threshold value.

4. The apparatus of claim 1, wherein transmit coils of the plurality of transmit coils have respective individual first predetermined threshold values.

5. The apparatus of claim 1, wherein a first predetermined threshold value associated with a first one of the plurality of transmit coils is different from a first predetermined threshold value associated with a second one of the plurality of transmit coils.

6. The apparatus of claim 1, wherein the processing core is to determine the first predetermined threshold value for each of the plurality of transmit coils using a calibration operation.

7. The apparatus of claim 6, wherein the processing core is to perform the calibration operation by, for each of the plurality of transmit coils with no receive coil and no foreign objects in proximity to the plurality of transmit coils:
  sample the measurement voltage potential responsive to discharging of the tank circuit, identify calibration peaks of the measurement voltage potential, determine calibration peak to peak amplitude differences between positive calibration peaks and negative calibration peaks;
  determine a calibration average of the calibration peak to peak amplitude differences; and
  determine the first predetermined threshold value responsive to the determined calibration average.

8. An apparatus, comprising:
  a tank circuit comprising a transmit capacitor and selectively comprising a respective one of a plurality of transmit coils connected to the transmit capacitor, and
  a controller to select one of the plurality of transmit coils to use to transmit wireless power responsive to a lowest of average amplitude differences between positive peaks and negative peaks of a measurement voltage potential for each of the plurality of transmit coils.

9. The apparatus of claim 8, comprising a power filter to receive a square wave signal and provide a sinusoidal signal to the plurality of transmit coils and the transmit capacitor responsive to the square wave signal.

10. The apparatus of claim 9, wherein the power filter comprises a second order inductive and capacitive power filter.

11. The apparatus of claim 9, wherein the power filter comprises a filter capacitor electrically connected from a first filter inductor to a second filter inductor.

12. The apparatus of claim 11, wherein the power filter comprises another filter capacitor electrically connected to the second filter inductor and the filter capacitor.

13. An apparatus, comprising:
  a tank circuit comprising a transmit capacitor and selectively comprising a respective one of a plurality of transmit coils connected to the transmit capacitor, and a controller to select one of the plurality of transmit coils to use to transmit wireless power responsive to average differences between positive peaks and negative peaks of a measurement voltage potential for each of the plurality of transmit coils, the measurement voltage potential proportional to a tank circuit voltage potential, or a tank circuit current, of the tank circuit responsive to discharge of the tank circuit, wherein the controller is to determine that no receive coil and no foreign object is proximate to the plurality of transmit coils responsive to a lowest of average amplitude differences between the positive peaks and the negative peaks being not less than a first predetermined threshold value.

14. The apparatus of claim 13, wherein the controller is to determine that foreign object is proximate to the plurality of transmit coils responsive to the lowest of the average of amplitude differences between the positive peaks and the negative peaks being less than a second predetermined threshold value.

15. An apparatus, comprising:
a tank circuit comprising a transmit capacitor and selectively comprising a respective one of a plurality of transmit coils connected to the transmit capacitor; and
a controller to select one of the plurality of transmit coils to use to transmit wireless power responsive to average differences between positive peaks and negative peaks of a measurement voltage potential for each of the plurality of transmit coils, the measurement voltage potential proportional to a tank circuit voltage potential, or a tank circuit current, of the tank circuit responsive to discharge of the tank circuit,
wherein the controller is to determine that a foreign object is proximate to the plurality of transmit coils responsive to a lowest of the average of amplitude differences between the positive peaks and the negative peaks being less than a second predetermined threshold value.

16. An apparatus, comprising:
a tank circuit comprising a transmit capacitor and selectively comprising a respective one of a plurality of transmit coils connected to the transmit capacitor; and
a controller to select one of the plurality of transmit coils to use to transmit wireless power responsive to average differences between positive peaks and negative peaks of a measurement voltage potential for each of the plurality of transmit coils, the measurement voltage potential proportional to a tank circuit voltage potential, or a tank circuit current, of the tank circuit responsive to discharge of the tank circuit,
wherein the controller is to enter a sleep mode responsive to a determination that a foreign object is proximate to the plurality of transmit coils or to a determination that no foreign object and no receive coil is proximate to the plurality of transmit coils.

17. A method of detecting an object, the method comprising:
determining a lowest average of peak to peak amplitude differences corresponding to a plurality of transmit coils;
determining that nothing is proximate to the plurality of transmit coils responsive to a determination that the lowest average of peak to peak amplitude differences is not less than a first predetermined threshold value;
determining that a foreign object is proximate to the plurality of transmit coils responsive to a determination that the lowest average of peak to peak amplitude differences is less than the first predetermined threshold value and less than a second predetermined threshold value; and
selecting a transmit coil corresponding to the lowest average of peak to peak amplitude differences to transmit wireless power responsive to a determination that the lowest average of the peak to peak amplitude differences is less than the first predetermined threshold value and not less than the second predetermined threshold value.

18. The method of claim 17, comprising:
setting a coil number equal to a first number, respective transmit coils of the plurality of transmit coils associated with a respective number from a first number to a last number;
closing a coil switch associated with the coil number to electrically connect the respective transmit coil associated with the coil number to implement a tank circuit including the transmit coil and a transmit capacitor;
applying a sinusoidal or square wave signal to the tank circuit;
sampling a measurement voltage potential responsive to a tank circuit signal during discharge of the tank circuit after application of the sinusoidal signal to the tank circuit is complete;
incrementing the coil number; and
returning to closing the coil switch associated with the coil number responsive to a determination that the coil number is not greater than a number of the plurality of transmit coils.

19. The method of claim 18, comprising:
setting the coil number equal to the first number;
identifying peaks in a sampled measurement voltage potential associated with the coil number;
determining peak to peak amplitude differences between positive peaks and negative peaks;
determining an average of the peak to peak amplitude differences;
storing a determined average to one or more data storage devices;
incrementing the coil number; and
returning to identify the peaks in the sampled measurement voltage potential responsive to a determination that the coil number is not greater than a number of the plurality of transmit coils.

20. The method of claim 17, comprising:
setting a coil number equal to a first number, each transmit coil of the plurality of transmit coils associated with a number from a first number to a last number;
exciting a transmit coil corresponding to the coil number;
sampling a measurement voltage potential responsive to a tank circuit signal during discharge of the tank circuit after excitation of the transmit coil is completed;
identifying peaks of the measurement voltage potential;
determining peak to peak amplitude differences between positive peaks and negative peaks of the measurement voltage potential;
determining an average of the peak to peak amplitude differences;
determining the first predetermined threshold value responsive to the determined average of the peak to peak amplitude differences;
incrementing the coil number; and
returning to excite the transmit coil corresponding to the coil number responsive to a determination that the coil number is not greater than a number of the plurality of transmit coils.

* * * * *

UNITED STATES PATENT AND TRADEMARK OFFICE
CERTIFICATE OF CORRECTION

PATENT NO. : 12,040,632 B2
APPLICATION NO. : 17/664769
DATED : July 16, 2024
INVENTOR(S) : Santosh Bhandarkar and Alex Dumais It is certified that error appears in the above-identified patent and that said Letters Patent is hereby corrected as shown below:

In the Specification
Column 21, Line 10, change "Pavg=$\sum P_k$/N," to --Pavg=$\sum P_k$/N,--

In the Claims
Claim 8, Column 30, Line 46, change "transmit capacitor, and" to --transmit capacitor; and--
Claim 13, Column 30, Line 67, change "transmit capacitor, and" to --transmit capacitor; and--

Signed and Sealed this
Fifteenth Day of October, 2024

Katherine Kelly Vidal
*Director of the United States Patent and Trademark Office*